United States Patent

Enokido et al.

[11] Patent Number: 5,933,634
[45] Date of Patent: Aug. 3, 1999

[54] MOCK-UP METHOD AND MOCK-UP CONTROL SYSTEM FOR DISPLAYING PSEUDO OPERATION

[75] Inventors: Shigenori Enokido; Hiromi Akuta; Takayuki Kimura; Yasushi Kamiōka; Kenji Kato, all of Tokyo, Japan

[73] Assignee: Fujitsu Limited, Kawasaki, Japan

[21] Appl. No.: 08/787,157

[22] Filed: Jan. 22, 1997

[30] Foreign Application Priority Data

Jan. 23, 1996 [JP] Japan .................................. 8-009616

[51] Int. Cl.⁶ .............................. G06F 15/00; G06F 17/00
[52] U.S. Cl. ......................... 395/701; 395/705; 707/504; 707/505; 707/506; 707/507
[58] Field of Search .................... 395/701, 500, 395/682–683, 672, 677; 707/3–4, 505–507; 345/326, 338, 339–340, 352, 356, 342–344, 146, 349; 364/578, 488–489

[56] References Cited

U.S. PATENT DOCUMENTS

| | | | |
|---|---|---|---|
| 4,827,423 | 5/1989 | Beasley et al. | 395/672 |
| 4,989,134 | 1/1991 | Shaw | 707/206 |
| 5,047,960 | 9/1991 | Sloan | 707/507 |
| 5,485,607 | 1/1996 | Lomet et al. | 707/8 |
| 5,563,998 | 10/1996 | Yaksich et al. | 707/507 |
| 5,563,999 | 10/1996 | Yaksich et al. | 707/507 |
| 5,615,326 | 3/1997 | Orton et al. | 345/356 |
| 5,706,516 | 1/1998 | Chang et al. | 707/1 |

*Primary Examiner*—James P. Trammell
*Assistant Examiner*—Cuong H. Nguyen
*Attorney, Agent, or Firm*—Staas & Halsey LLP

[57] ABSTRACT

A screen layout corresponding to a transaction routine is input to a FORM, and an item and a code of design information corresponding to a screen input are generated as a table. A location of the screen input is associated with a record in a design information table, and the design information table is searched for based on the screen input to display a screen output, in a program design process prior to the program manufacturing process, so that pseudo operations of the transaction routine are performed on the screen. The present invention reduces an amount of feedback after a program is manufactured, by displaying a screen in a similar manner as in actual program execution, and verifying the program, in a program design process prior to a program manufacturing process of a transaction routine, and also makes program generation efficient, by inheriting data from the design process to the program manufacturing process.

25 Claims, 41 Drawing Sheets

FIG. 8

| TERM | TERM ID |
|---|---|
| PROCESS | SYR |
| PRODUCT | SYO |
| CONTRACT | KYK |
| SHIPMENT | SYU |
| RESPONSIBLE PERSON | TAN |
| NAME | NM |
| TYPE | KB |
| COST | KIN |
| CODE | CD |
| DATE | YMD |
| PRINTING EXECUTION | PRT |
| BUTTON | BTN |

FIG. 9

| ITEM | ITEM ID | NUMBER OF DIGITS | DATA TYPE | |
|---|---|---|---|---|
| PROCESS TYPE | SYRKB | 1 | CHARACTER TYPE | ⎫ |
| PROCESS TYPE NAME | SYRKBNM | 10 | CHARACTER TYPE | |
| PRODUCT CODE | SYOCD | 4 | CHARACTER TYPE | |
| PRODUCT NAME | SYONM | 20 | CHARACTER TYPE | |
| PRODUCT TYPE | SYOKB | 1 | NUMERIC TYPE | |
| PRODUCT PRICE | SYOKIN | 8 | NUMERIC TYPE | BASIC ATTRIBUTES |
| PROCESS TYPE | SYRKB | 1 | CHARACTER TYPE | |
| CONTRACT TYPE | KYKKB | 1 | CHARACTER TYPE | |
| CONTRACT NAME | KYKNM | 30 | CHARACTER TYPE | |
| CANTRACT DATE | KYKYMD | 8 | NUMERIC TYPE | |
| CONTRACTED PRICE | KYKKIN | 8 | NUMERIC TYPE | |
| RESPONSIBLE PERSON CODE | TANCD | 3 | CHARACTER TYPE | |
| RESPONSIBLE PERSON NAME | TANNM | 15 | CHARACTER TYPE | |
| SHIPMENT DATE | SYKYMD | 8 | NUMERIC TYPE | ⎭ |
| PRINTING EXECUTION BUTTON | PRIBTM | | | |

FIG. 13

| SCREEN ID | ITEM NAME | ITEM ID | NUMBER OF DIGITS | DATA TYPE | GROUP ID | ESSEN-TIALITY | EDITING TYPE | ITEM TYPE | CODE ID | NAME DISPLAY ITEM |
|---|---|---|---|---|---|---|---|---|---|---|
| SYOENTRY | PROCESS TYPE | SYRKB | 1 | CHARACTER TYPE | 1 | 1 | 00 | TXT | SYRKUBUN | SYRKBNM |
| SYOENTRY | PROCESS TYPE NAME | SYRKENM | 10 | CHARACTER TYPE | 1 | 0 | 00 | LBL | | |
| SYOENTRY | PRODUCT CODE | SYOCD | 4 | CHARACTER TYPE | 2 | 1 | 00 | TXT | | |
| SYOENTRY | PRODUCT NAME | SYOMN | 20 | CHARACTER TYPE | 2 | 0 | 00 | LBL | | |
| SYOENTRY | PRODUCT TYPE | SYOKB | 1 | NUMERIC TYPE | 2 | 1 | 00 | TXT | | |
| SYOENTRY | PRODUCT PRICE | SYOKIN | 8 | NUMERIC TYPE | 2 | 1 | 10 | LBL | | |
| KYKINPUT | CONTRACT TYPE | KYKKB | 1 | CHARACTER TYPE | 1 | 1 | 00 | TXT | | |
| KYKINPUT | CONTRACT NAME | KYKNM | 30 | CHARACTER TYPE | 1 | 1 | 00 | LBL | | |
| KYKINPUT | RESPONSIBLE PERSON CODE | TANCD | 3 | CHARACTER TYPE | 1 | 1 | 20 | TXT | TANTOU | TANNM |
| KYKINPUT | RESPONSIBLE PERSON NAME | TANNM | 15 | CHARACTER TYPE | 1 | 0 | 10 | LBL | | |
| KYKINPUT | CONTRACT DATE | KYKYMD | 8 | NUMERIC TYPE | 2 | 0 | 20 | TXT | | |
| KYKINPUT | CONTRACTED PRICE | KYKKIN | 8 | NUMERIC TYPE | 2 | 1 | 10 | TXT | | |
| KYKINPUT | SHIPMENT DATE | SYKYMD | 8 | NUMERIC TYPE | 2 | 0 | 20 | LBL | | |
| KYKINPUT | PRINTING EXECUTION BUTTON | PRTBTM | | | 3 | | | BTN | | |

{ SELECTION FROM ITEM DICTIONARY } { MANUALLY-INPUT INFORMATION } { SELECTION FROM CODE MANAGEMENT TABLE } { MANUALLY-INPUT INFORMATION }

FIG. 14

| MESSAGE ID | MESSAGE | |
|---|---|---|
| E001 | TERMINATE TRANSACTION | |
| E002 | INPUT VALUE BETWEEN 1% AND 2% | |

TABLE MESSAGE MASTER

FIG. 15

| BUTTON ID | BUTTON 1 | BUTTON 2 | BUTTON 3 | BUTTON 4 | ...... | BUTTON 13 |
|---|---|---|---|---|---|---|
| B001 | TERMINATION | SEARCH | UPDATE | REGISTRATION | ...... | ESB |
| B002 | TERMINATION | | | REGISTRATION | ...... | |

TABLE COMMAND BUTTON

INPUT/OUTPUT INFORMATION DEFINITION (ACTION)

SCREEN NAME: PRODUCT REGISTRATION
FORM ID : ABC12301, FRM

| GROUP | MESSAGE ID | BUTTON ID |
|---|---|---|
| 1 | E001 | B001 |
| 4 | E010 | B002 |
| 7 | E015 | B003 |

ACTION TABLE

FIG. 20

| SCREEN ID | ITEM ID | NUMBER OF DIGITS | DATA TYPE | GROUP ID | ESSEN-TIALITY | EDITING TYPE | ITEM TYPE | CODE ID | NAME DISPLAY ITEM |
|---|---|---|---|---|---|---|---|---|---|
| SYOENTRY | SYRKB | 1 | CHARACTER TYPE | 1 | 1 | 00 | TXT | SYRKUBUN | SYRKBNM |
| SYOENTRY | SYRKBNM | 10 | CHARACTER TYPE | 1 | 0 | 00 | LBL | | |
| SYOENTRY | SYOCD | 4 | CHARACTER TYPE | 2 | 1 | 00 | TXT | | |
| SYOENTRY | SYONM | 20 | CHARACTER TYPE | 2 | 0 | 00 | LBL | | |
| SYOENTRY | SYOKB | 1 | NUMERIC TYPE | 2 | 1 | 10 | TXT | | |
| SYOENTRY | SYCKIN | 8 | NUMERIC TYPE | 2 | 1 | 00 | LBL | | |
| KYKINPUT | KYKKB | 1 | CHARACTER TYPE | 1 | 1 | 00 | TXT | | |
| KYKINPUT | KYKNM | 30 | CHARACTER TYPE | 1 | 1 | 20 | LBL | | |
| KYKINPUT | TANCD | 3 | CHARACTER TYPE | 1 | 0 | 10 | TXT | TANTOU | TANNM |
| KYKINPUT | TANNM | 15 | CHARACTER TYPE | 2 | 0 | 20 | LBL | | |
| KYKINPUT | KYKYMD | 8 | NUMERIC TYPE | 2 | 1 | 10 | TXT | | |
| KYKINPUT | KYKKIN | 8 | NUMERIC TYPE | 2 | 0 | 20 | TXT | | |
| KYKINPUT | SYKYMO | 8 | NUMERIC TYPE | 2 | | 10 | LBL | | |
| KYKINPUT | PRIBTN | | | 3 | | | BTN | | |

MANUALLY-INPUT INFORMATION

SELECTION FROM CODE MANAGEMENT TABLE

MANUALLY-INPUT INFORMATION

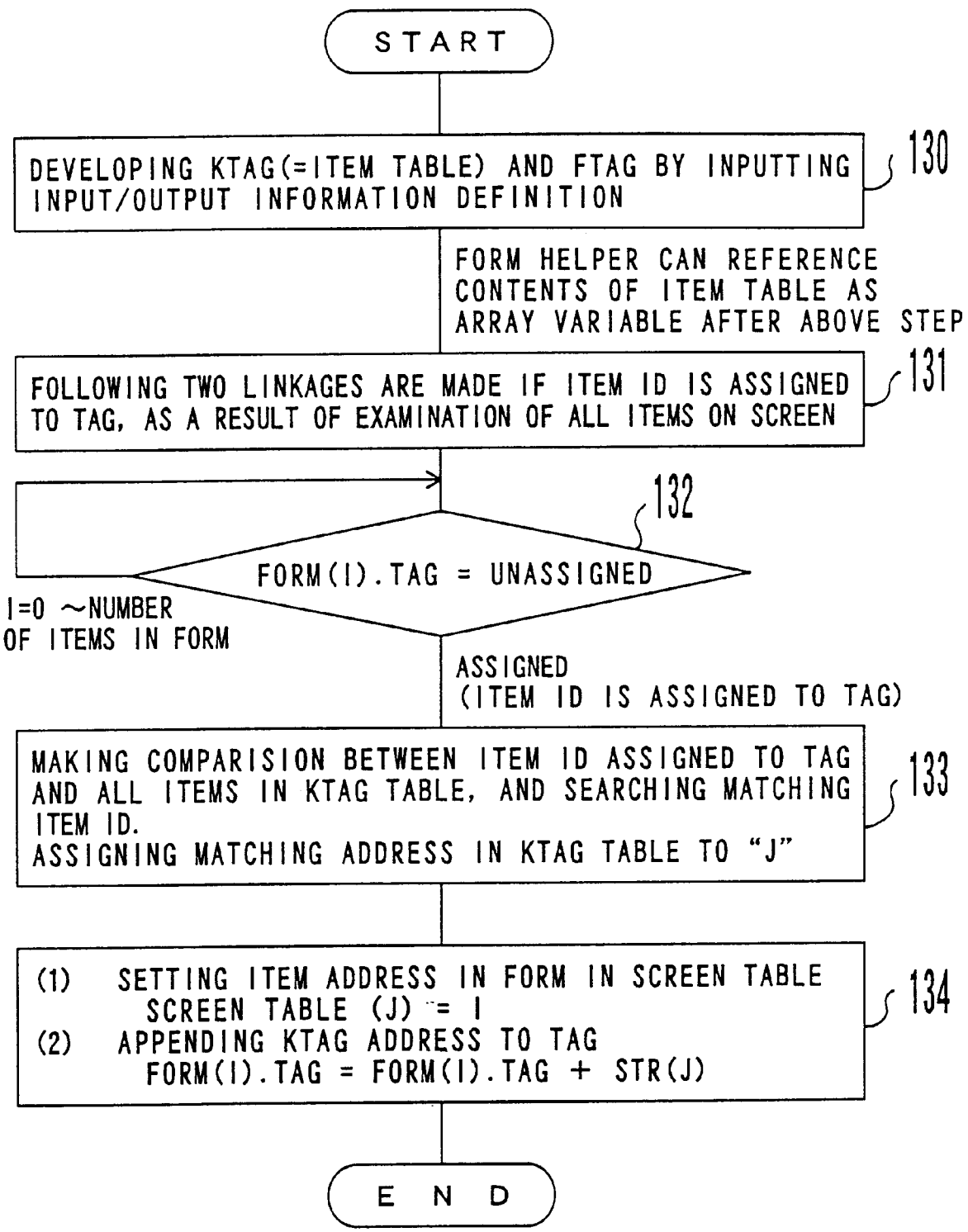
F I G. 2 1

| INPUT VALUE | EDITING ID (DESCRIPTION) | DISPLAY FORMAT AFTER EDITED |
|---|---|---|
| 123456 | 00 (NO EDITING) | 123456 |
| | 22 (NUMERIC EDITING) | 123,456 |
| | 32 (CORRENCY EDITING) | ¥123,456 |
| 19960101 | 52 (DATE EDITING) | 1996/01/01 |

F I G. 2 6

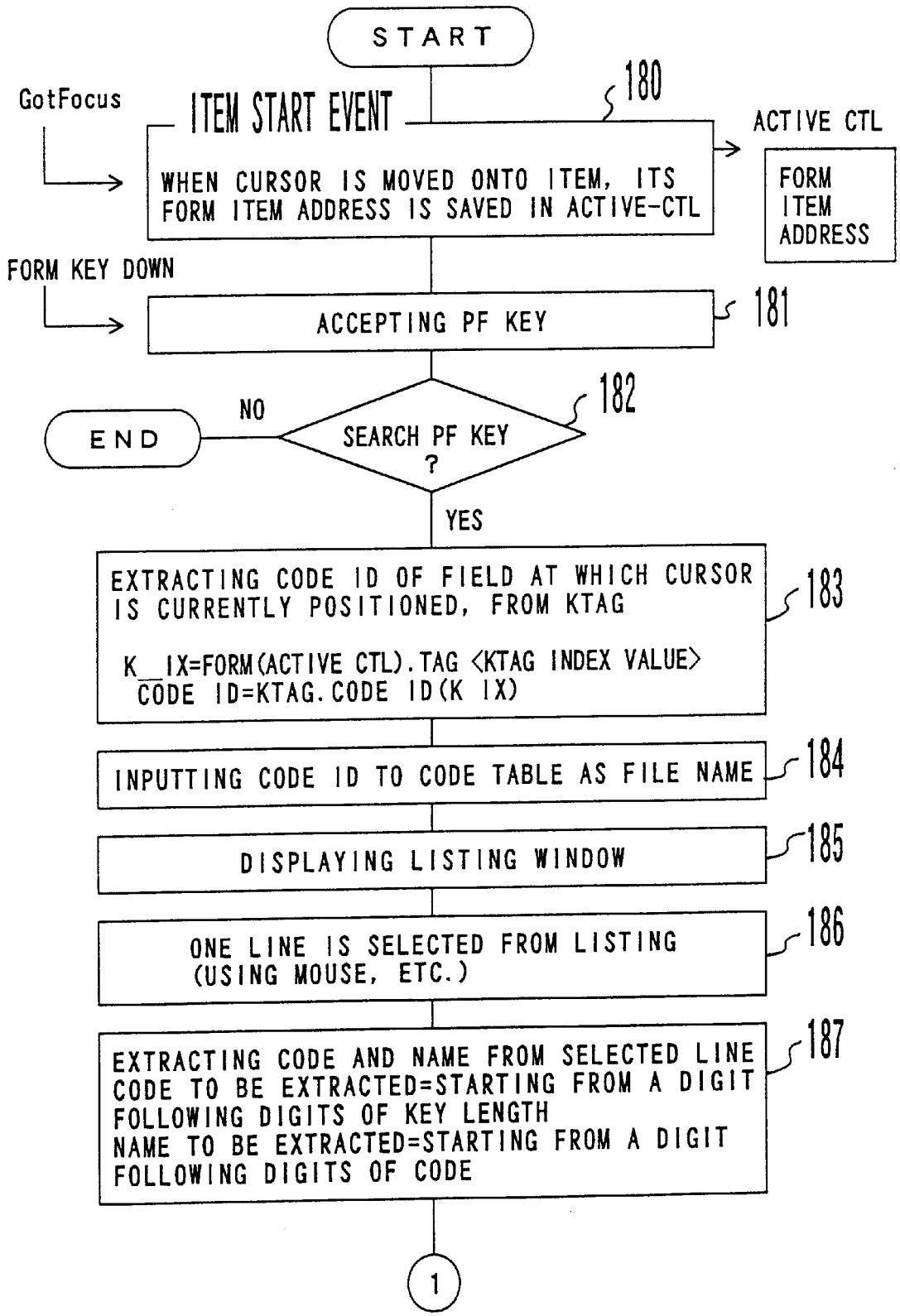
F I G. 3 0

MOCK-UP METHOD AND MOCK-UP CONTROL SYSTEM FOR DISPLAYING PSEUDO OPERATION

BACKGROUND OF THE INVENTION

1. Field of the Invention

The present invention relates to a screen control mock-up system for displaying a pseudo operation of a program, and more particularly to a screen control mock-up system for making software design and manufacturing processes efficient by providing a mock-up (model) for displaying simulation operations of software at an intermediate stage from a software design to its manufacturing, before the application software is completed, in order to offer a software system.

2. Description of the Related Art

In a conventional design of application software, a system engineer needs to understand a user's explanation about a system for which the application software is to be provided, to make its basic design satisfy the user system requirements, to actually encode the application software, provide the user with the encoded application, and verify if the provided application runs properly as the user desires. Therefore, if the completed application software does not satisfy the user requirements, it is returned to the system engineer despite the completion of the encoding. As a result, the system engineer must remake the application software from the design stage.

Furthermore, a considerable amount of time is spent before the user is able to verify whether the application software that the user requests from a software house to design, runs as he or she desires, and the user must wait for an actual coding of the application software.

In recent years, a method such as a spiral method or a prototype method has been proposed in consideration of the above described problems. According to such a method, the entire process from a design stage to a manufacturing stage is not performed in a waterfall-like manner, and a system engineer or a software house frequently reports a partway process to the user during the performance of the entire process, and makes the user verify a half-coded program if necessary, in order to overcome the above described problems caused by return after completion of the manufacturing of the application software. With such a method, however, return of the coding may occur each time the software house discusses the application software with the user. Actually, an amount of time required for manufacturing the entire application software cannot significantly be reduced, compared to the case in which the coded software is changed after the completion of the manufacturing.

Additionally, a system engineer who acquires system requirements from a user first draws a screen layout used for executing a transaction routine on paper or by using a word processor. Then, the user designs the transaction routine based on the screen layout made on paper or by using a word processor. If any change is made to the design partway, such a screen layout remains unchanged.

There is another problem in that a considerable amount of time is required to complete a manufacturing process, because it must be started from scratch (without any inheritance) after the design process is completed.

SUMMARY OF THE INVENTION

A first object of the present invention is to provide a software development method for making software design and manufacturing processes efficient, and completing application software in which a user desire is specifically reflected, in consideration of the above described conventional problems.

A second object of the present invention is to shorten a manufacturing process by generating item information to be displayed in a screen layout during a design process, and the information generated in the design process is also passed on to the manufacturing process.

A third object of the present invention is to intensively manage data such as a screen layout, etc. by directly inputting a design process to a FORM to start the process, when a system engineer obtains system requirements.

An embodiment according to the present invention is intended to provide a mock-up method comprising the steps of: inputting a screen layout corresponding to a transaction routine to a FORM; generating item information to be input to the FORM as design information at a stage prior to a manufacturing process of the transaction routine; and executing a mock-up by displaying information about the item information on a screen based on the design information, in correspondence with an input of the item information to the screen, and implementing a screen display in the case in which the transaction routine is actually executed, at a stage prior to the manufacturing process of the transaction routine.

Another embodiment according to the present invention is intended to provide a mock-up control system, which comprises: a FORM corresponding to a screen; a code table including at least transaction code related to a transaction routine; an item table including at least item IDs and code IDs; a pointer for associating a field location in the FORM with an address in the item table; and a name reference and code checking unit for referencing name and code from the code table using the pointer, or checking to see if code is correct based on the code input to the FORM field, and displaying the name and code in a particular field in the FORM, and generates the item table relating to the transaction routine and a corresponding code table using the name reference and code checking unit, independently from the generation of an actual program of the transaction routine.

A further embodiment of the present invention is intended to provide a mock-up control system for making a screen transition which is partially similar to that of the transaction routine, independently from the generation of an actual program by using a group control unit, which comprises: a FORM corresponding to a screen; an item table including item IDs and code IDs; a pointer for associating a field address in the FORM with an address in the item table; a group control unit for controlling a cursor movement accompanying the input process to the FORM, and the process performed by referencing the item table, by moving the cursor to each of head, body, and tail groups, into which a screen is partitioned, in this order.

Still further embodiment of the present invention is intended to provide a program generating system which comprises: a unit for inputting a screen related to data used for a transaction routine; a unit for storing design information about the data used for the transaction routine; and a unit for associating a data location on the screen with the design information.

A still further embodiment of the present invention is intended to provide a program generating method which comprises the steps of: inputting a FORM used for a transaction routine to a screen; generating a design data file in correspondence with an input to the FORM at a design stage prior to a program manufacturing process; controlling validity of item information input to the FORM based on design information and displaying a result on the screen; and automatically passing on the design information to a process for manufacturing a program.

Still further embodiment of the present invention is intended to provide a FORM helper design method which comprises the steps of: generating a FORM in correspondence with a transaction routine; generating an item table including at least item IDs of items used for the transaction; arranging a TAG area for a predetermined item in the FORM; and setting an item ID corresponding to the predetermined item in the FORM, in a screen table.

Still further embodiment of the present invention is intended to provide a FORM helper control method which comprises the steps of: generating a screen table in which an address is arranged for each address in an item table using a FORM helper designed with the FORM helper design method; searching for the item table based on an item ID set in the TAG area; setting an item address in the item table in the TAG area if matching is found for the item ID and setting a FORM item address of a predetermined item in the FORM.

Still further embodiment of the present invention is intended to provide a mock-up method which comprises the steps of: inputting predetermined item information corresponding to a transaction routine, to a FORM by using the FORM control method; displaying an output corresponding to the predetermined item information input based on design information of a predetermined item, on a screen; and verifying a screen display when an actual transaction routine is manufactured, by performing the above described screen input step and screen output step prior to the manufacturing process of the transaction routine.

Still further embodiment of the present invention is to provide an item dictionary generating method which comprises the steps of: generating a glossary storing both terms structuring a portion of items used on a screen in correspondence with a transaction routine, and their IDs; and generating an item by combining terms, generating an item ID by combining term IDs, and generating an item dictionary by making a correspondence between the item and the item ID.

According to the present invention, an input/output information definer corresponding to a screen display is generated by first inputting item information used for a transaction routine to a FORM corresponding to a screen, registering the item information to an item directory, and selecting and displaying required item data such as an item name, etc., on a screen, in a design process. Since each input/output information definer corresponds to each screen display, display on a screen can be controlled by referencing the input/output information definer, within the computer. When a data entry program is verified, it can be determined whether or not data displayed on the screen, for example, an item such as a process type etc., conforms to a designed attribute, by referencing the input/output information definer with a checking routine. Assume that data of 6 digits is input to a screen although an attribute of an item in the process type is specified as data of 8 digits. In this case, this input is recognized and displayed as an error on a screen. Therefore, a user can learn whether data in a process type that the user himself inputs is correct, prior to manufacturing of an actual program.

As a result, the user can verify, for example, a data entry in a process type, etc., before a program is actually coded and manufactured, using a mock-up system according to the present invention. A software house can display or run a state of data input on a screen in a simulative manner, without actually coding a program, so that processes for designing and manufacturing a program can significantly be simplified, compared with the case in which a data entry program is manufactured, verified, and returned, in order to modify the coded program. Furthermore, a software user no longer needs to wait for an actual coding of the program, and can display a simulation output on a screen at an extremely early stage, because the mock-up and user system can be run, for example, immediately after the user requests his or her desired system to a software house. Accordingly, the software user can verify whether his or her procedure of data entry is correct, or in what form the system that he or she requested will be developed on a screen after the requested system is programmed, at a stage prior to an actual manufacturing stage of the program, that is, at an extremely early stage.

Since the program entry process used for mock-up operations is automatically passed on to the program manufacturing process as described above, a portion generated by the mock-up operations does not need to be coded at the stage of manufacturing an actual program. As a result, the process for manufacturing a program can be made faster.

Furthermore, because common components such as screen control, etc. or a transaction-common routine such as a message etc. are used for almost all programs in common, in order to make a data entry, such common components or transaction-common routine can be used again in the mock-up process. Additionally, the common components or the transaction-common routine are automatically passed on to the manufacturing process as it is, and can be used again. A portion of transaction skeleton can be used in association with the mock-up operations, which allows the portion to be used again in a transaction routine depending on need.

Still further, since data used in the design process is intensively managed, data modification accompanying with a design change can be made with ease, according to the present invention.

BRIEF DESCRIPTION OF THE DRAWINGS

FIG. 8 exemplifies the glossary;

FIG. 9 exemplifies the item dictionary;

FIG. 13 exemplifies an input/output information definition table;

FIG. 14 exemplifies a message table;

FIG. 15 exemplifies a button table;

FIG. 20 exemplifies an item table;

FIG. 21 is a flowchart showing the initial process performed by the FORM helper;

FIG. 26 exemplifies an editing process;

FIGS. 30 and 31 are flowcharts showing a process for referencing code of a FORM helper;

DESCRIPTION OF THE PREFERRED EMBODIMENT

Figure 1:
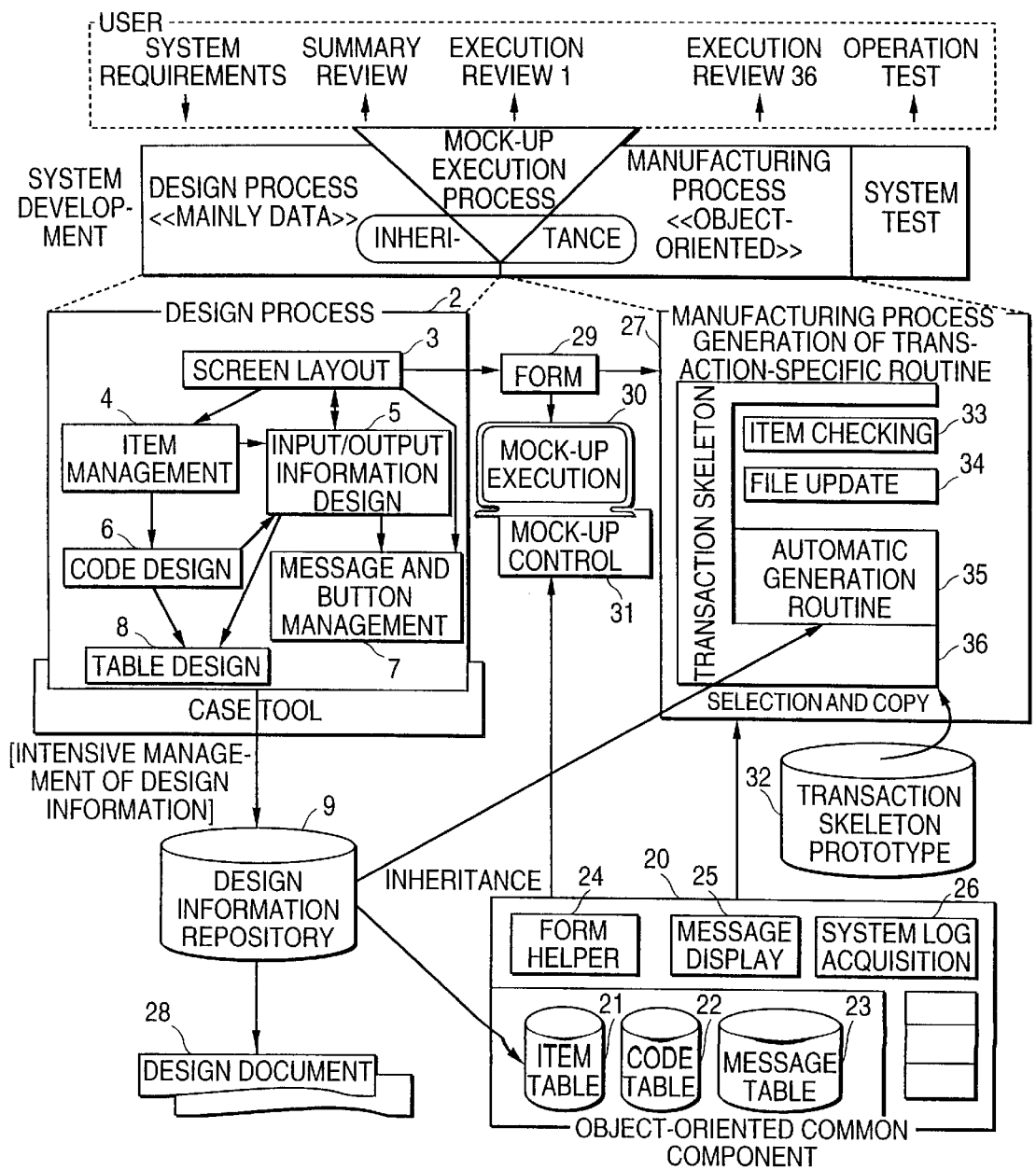
FIG. 1 is a schematic diagram showing the principle of the present invention.

Provided below is the explanation about the principle of the present invention, by referring to FIG. 1.

A system engineer who obtains system requirements from a client starts system development, and performs a design process based mainly on data. The client reviews an outline of the program during the design process. The client only reviews, however, a static screen designed by the system engineer at this stage, and the screen does not function at all, thereby providing no dynamic display.

At a next stage on which a mock-up according to the present invention is executed, a screen display is controlled as if the program were running, even though it has not been actually manufactured, so that a mock-up execution review 1 can be performed by a user(that is, client). If the client points out a problem which may arise when the program is actually manufactured and executed when using the mock-up execution review 1, the system engineer can readily modify the design of the program. A screen layout 3, an input/output information design 5, and a code design 6, as item management information 4, message and button management information 7, and a table design 8, all of which are generated by using a CASE tool in a design process 2, are intensively managed as design information 9 in a file. An item table 21, code table 22, and a message table 23 are generated as object-oriented common components 20 based on the design information 9, and at the same time, a FORM helper 24 is provided, and a message display 25 and a system log acquisition 26 are performed. The design information 9 can automatically be passed on to a process for manufacturing an object-oriented program and a process for generating the item table 21. The object-oriented common components 20 encapsulate data stored in the item table 21, code table 22, and message table 23, in order to pass on the encapsulated data to a manufacturing process. Note that the contents of the design information (repository) 9 may be output as a design document 28.

In the mock-up execution process, items are input to a screen using the capabilities of a FORM 29, and the validity of the screen input can be displayed on a screen by using the capabilities of the FORM helper 24, and referencing the item table 21, code table 22, and message table 23. Here, the FORM 29 is a screen definer, for example, for use in a programming language called Visual Basic running on WINDOWS provided by the Microsoft Company in the U.S. Only a screen appears under the title "FORM", a screen layout, and, for example, a process type or a product code for a product inquiry routine, can be input on the screen in consideration of a transaction specification. The FORM helper 24 is a program used for the FORM for helping a user input data to the FORM, and perform processing of the input data. For example, if the number of digits, or an attribute of data input to a screen does not conform to the design information, the FORM helper 24 displays an error or an error message. Additionally, if code is input to the screen, the FORM helper 24 outputs a name corresponding to the code, displays whether or not the code is correct, and displays a screen which allows item inputs on the screen in the order of head, body, and tail groups, etc. According to the present invention, a program can be exhibited to a client by displaying an output corresponding to an input to a screen, on a screen based on operations of the FORM helper at a stage of designing the program, as if the program were manufactured (this program exhibition is called "mock-up execution" 30 according to the present invention). Additionally, since the message display 25 and the system log acquisition 26 are routines common to each transaction, they are also enabled in the mock-up execution process.

After the mock-up execution 30 is performed with capabilities of mock-up control 31, a transaction skeleton common to each transaction is selected and copied from a transaction skeleton prototype 32 based on the automatically-inherited design information 9, in order to generate transaction-specific routines such as an item checking 33 which is a checking routine for scrutinizing each item, and file update 34 for executing each transaction; automatically generates routine 35 for transferring a file to a screen; and manufactures the program using a transaction skeleton 36, the transaction-specific routines, and the automatic generation routine 35, in a program manufacturing process 27. Then, an execution review 36 is performed as usual, and a system test is performed.

A mock-up execution module is composed of a FORM 29, mock-up control 31, and object-oriented common components 20 including a FORM helper 24. A transaction application execution module is composed of the FORM 29, object-oriented common components 20, and a manufacturing process 27.

According to the present invention, mock-up operations for generating an output corresponding to an input to a screen, can be performed in a design process, thereby allowing easy modification of a program at an early stage.

Furthermore, since item information generated in the design process is stored as a file, and can be passed on to a manufacturing process, a program can be generated efficiently. A mock-up execution module is composed of a FORM, mock-up control, and object-oriented common components, while a normal transaction application execution module is composed of the FORM, object-oriented common components, and a manufacturing process. Therefore, the manufacturing process inherits the FORM and object-oriented common components from the design process.

Conventionally, after a screen format is designed on paper, or by using a word processor based on system requirements, design data is generated, and the screen format based on the system requirements is generated in a FORM on a screen. According to the present invention, however, a FORM on a screen is generated based on the system requirements at the beginning of a design. Therefore, the design process can be simplified, and design information can be managed intensively.

Figure 2:
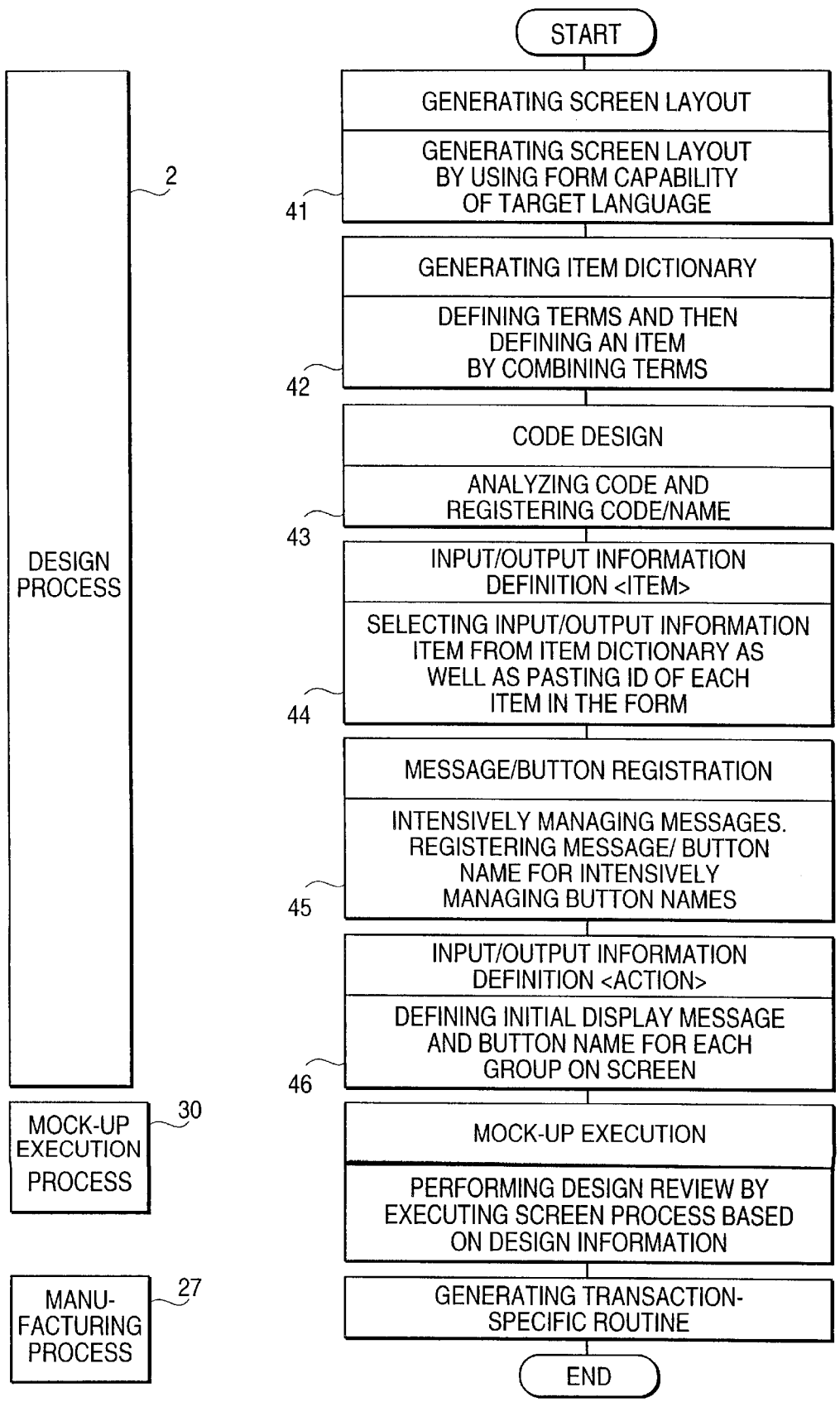
FIG. 2 shows a flowchart of an entire process, and a design process specifically.

FIG. 2 is a flowchart showing an entire process, and shows a design process specifically. Provided first is the explanation about the design process.

A screen layout is generated by inputting a layout or items to a screen definer called "FORM", by using, for example, a FORM capability of a target language such as Visual Basic, in step 41. Then, an item dictionary of items used for the screen layout is generated in step 42. An item which is not included in the item dictionary among the items used for the screen layout is divided into terms, and each of the terms is defined, so that an item definition is made by combining the terms. For an item which must specifically be defined among the items used for the screen layout, its code is first analyzed as a code design, and a correspondence between the code and its name is registered in step 43. For example, for an input/output information definition <item> made in step 44, input/output information items such as a name of each item, item ID, attribute, etc. are selected from the item dictionary, and each item ID is attached to a FORM. The attachment of each item ID is performed by arranging a TAG corresponding to each item in the FORM, and assigning each item ID to the TAG.

Next, message and button registration are performed in step 45. Message and button names are registered for intensively managing the messages and buttons. Names of initially-displayed messages and buttons are then defined for each group on a screen, and an input/output information definition <action> is made in step 46.

Since an input/output information definer and a screen display are linked with an item ID in a design process as described above, a screen process is performed based on design information to verify the design. This process is called a mock-up execution process, according to the present invention.

In the manufacturing process, the linkage between the screen display and the input/output information definition generated in the design process is used as it is, and common components are also used as they are. Accordingly, the program can be reused, and a transaction-specific routine satisfying each user need is generated.

Figure 3:
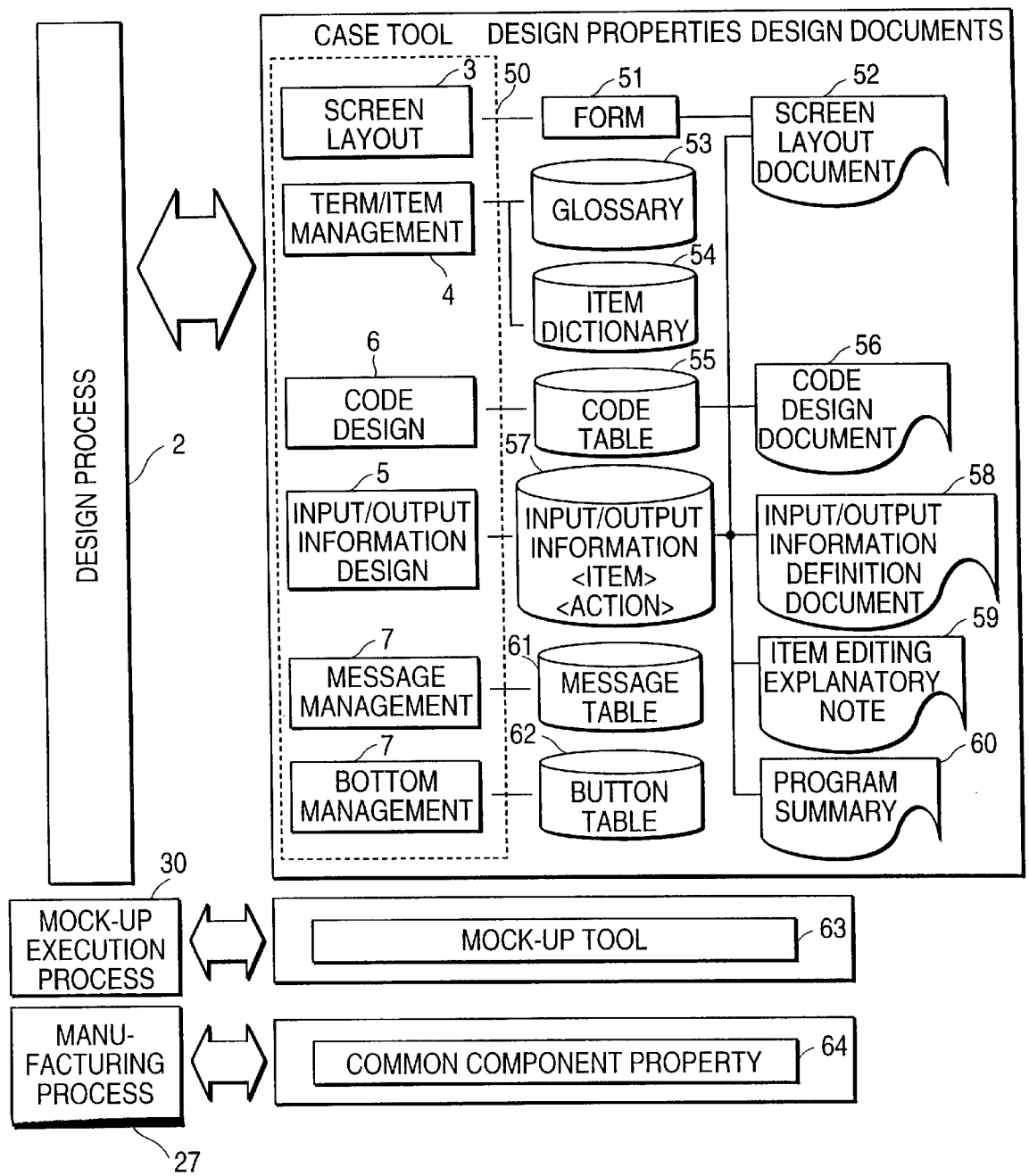
FIG. 3 shows a schematic diagram of the system configuration of the present invention, and a design process specifically.

FIG. 3 is a schematic diagram showing the configuration of an entire system according to the present invention, and shows a design process specifically. In a design process 2, a screen layout 3, term/item management 4, code design 6, input/output information design 5, message management 7, and button management 7, are performed by a CASE tool 50. The design process shown in FIG. 2 can be performed by intensively managing information using the CASE tool 50 shown in FIG. 3.

A FORM 51 obtained by the screen layout 3 is included as a design property, and a screen layout document 52 is output as a design document. The term/item management 4 includes a glossary 53 and an item dictionary 54 as design properties. The code design 6 includes a code table 55 as a design property, and outputs a code design document 56 as a design document. The input/output information design 5 includes an item, an action, etc. as input/output information 57 as design properties, and outputs an input/output information definition document 58 as a design document. Note that the input/output information 57 can output an item editing explanatory note 59, a program summary 60, and the screen layout document 52 in addition to the input/output information definition document 58. Furthermore, the message management 7 and button management 7 respectively include a message table 61 and a button table 62 as properties. The mock-up execution process 30 is performed by using a mock-up tool 63, which will be described later. The manufacturing process 27 inherits the FORM 51, glossary 53, item dictionary 54, code table 55, input/output information 57, message table 61, button table 62, and the item table 70 shown in FIG. 4, all of which are properties generated in the design process 2, and at the same time, performs its own task while reusing a program with common component properties 64 such as screen control, etc., common to each transaction routine.

Provided below is the explanation about a procedure for developing a mock-up shown in FIGS. 2 and 3 according to the present invention, by making a comparison with a conventional development procedure. With the conventional development procedure, a process must go back to a design stage after a program is designed and manufactured, or to a start point of a manufacturing stage. This is because design information is possessed only in the form of a document, and its image does not occur until the program manufacturing is completed. Since additional changes are made to a program specification, the probability of return is remarkably high. On the other hand, a screen control process can be implemented as a mock-up process, and a screen process such as a data entry, etc. can be performed without programming as shown in FIGS. 1, 2, and 3, according to the present invention. Therefore, a user can verify the screen control process for such as an item entry checking routine, etc. in an actually-running form. Because the mock-up can be executed according to the design information, the design process is performed while performing simulation with the mock-up, which leads to a reduction in the probability of return occurring after the completion of the manufacturing process. Also additional changes can be made to the design with ease. Furthermore, checking of the number of digits, checking of an essential input, etc., for design information, are made with the mock-up, and information such as a FORM, item definition, etc., which is verified with the mock-up in the design process during system development, are automatically passed on to the manufacturing process. Therefore, data used for the mock-up is reusable in an actual program manufacturing process.

As a result, respective tasks can definitely be assigned to design and manufacturing processes, and the manufacturing process can automatically and easily inherit design information even if these processes are separately performed, according to the present invention.

That is, not only the advantage brought about by performing the mock-up execution process, but also the advantage of shortening the manufacturing process by passing on properties used for the mock-up execution to the manufacturing process, can be attained, according to the present invention.

Figure 4:
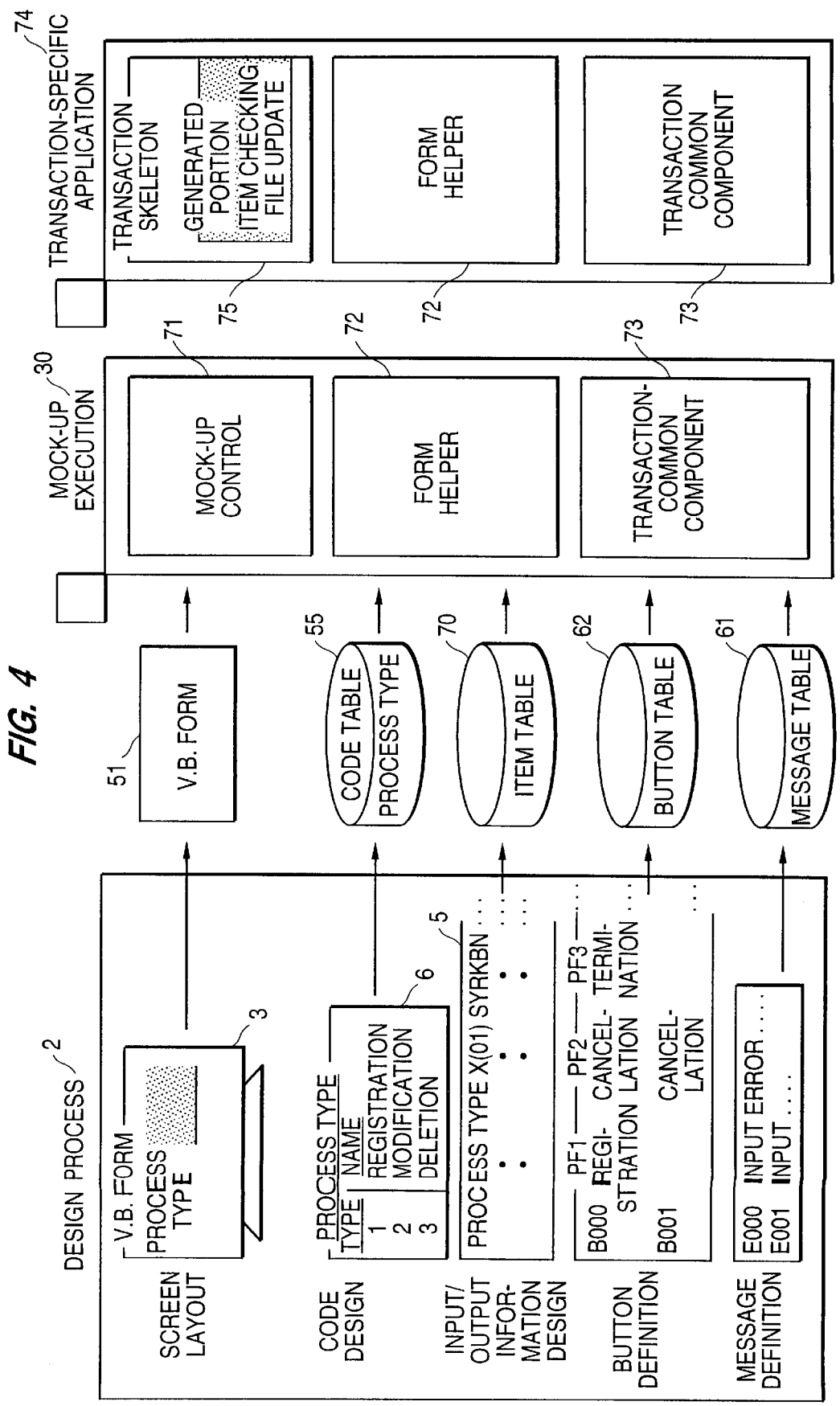
FIG. 4 shows a schematic diagram of the system configuration of the present invention, and the mock-up structure specifically.

FIG. 4 is a schematic diagram showing the configuration of a mock-up control system, and specifically shows mock-up execution and a transaction application, according to the present invention.

In the design process 2, the screen layout 3 displays, for example, a process type, etc. on a screen using the FORM 51 of Visual Basic. The code design 6 includes process types (codes) 1, 2, and 3 which are respectively named "registration", "modification", and "deletion", and stores each of the process types in a code table 55. The input/output information design 5 registers, for example, "SYRKBN" as an item ID if an item is a process type. The item ID is intended to make a computer identify an item. The input/output information design 5 generates an item table 70 based on input/output information. A button definition defines registration, cancellation, and termination, which respectively correspond to "PF1", "PF2", and "PF3" keys, for "B000". For "B001", only cancellation is defined, which corresponds to the PF2 key. A message definition defines "Entry error" as "E000", and "Make an entry" as "E001". The button definition and message definitions and respectively store their definitions in a button table 62 and a message table 61.

A screen layout is generated using a FORM capability of a target language at a time of shifting from the design process 2 to the mock-up execution process 30. The code design 6 selects, for example, a code of a process type from the code table 55. An item table 70 is generated based on an input/output information definition. The button table 62 and message table 61 are respectively generated based on the button and message definitions.

In the mock-up execution process 30, the data are inherited from the code, item, and button and message tables 55, 70, 62, and 61; controls such as a mock-up control 71 and a FORM helper 72 control are performed for the FORM 51; and a transaction-common component 73, which is a common routine, is accessed. To perform the mock-up control, it is determined whether or not, for example, a data entry conforms to registered data attributes using a checking routine arranged in the FORM helper 72, and a pseudo-output is provided as an input. At this time, logging, message display, etc. are controlled as basic system controls such as a screen display control, etc., using the transaction-common component 73. The mock-up execution process 30 includes, for example, (1) a checking routine such as checking of the number of digits and checking of an essential input, etc., (2) a routine for inputting code reference and a routine for displaying a code checking name, (3) group transition, and (4) message and button display, in addition to the above described attribute checking.

Furthermore, a transaction-specific application 74 inherits the process used in the mock-up execution process 30, and generates a routine for checking an item or a routine for updating a file, which is not included in a transaction skeleton 75 common to each transaction. The FORM helper 72 and the transaction-common component 73 inherited from the mock-up execution 30 are used. The transaction skeleton 75 is reusable. Its item checking routine checks a straddle between items, and detailed contents of each item, while its file update routine updates a file depending on the need of each transaction.

Figure 5:
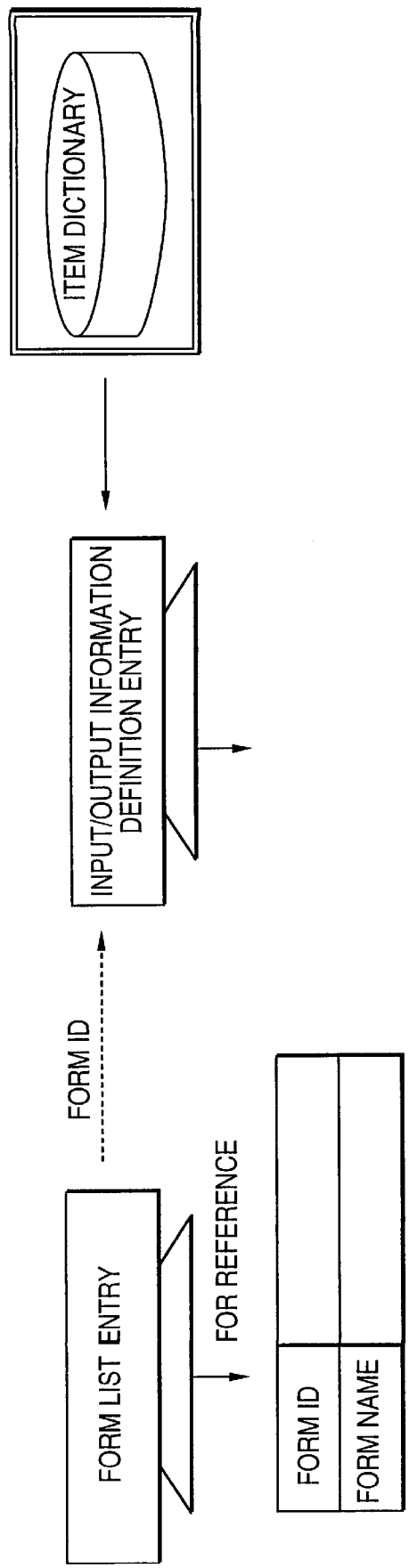
FIG. 5 is a schematic diagram showing a relationship between a FORM, input/output information definition, and an item dictionary.

FIG. 5 shows the relationship between a FORM listing, item dictionary, both of which are generated in the design process, and an input/output information definition.

A FORM ID is attached and a FORM name is given to each screen. The FORM listing is first referenced to select a single FORM, and an input/output information definition is made for the selected FORM according to the item dictionary.

Provided below is the specific explanation about the flowchart shown in FIG. 2 according to the present invention.

The specific explanation about the method for generating the item dictionary shown in FIG. 2 is provided, by referring to FIGS. 6 through 9.

Figure 6:
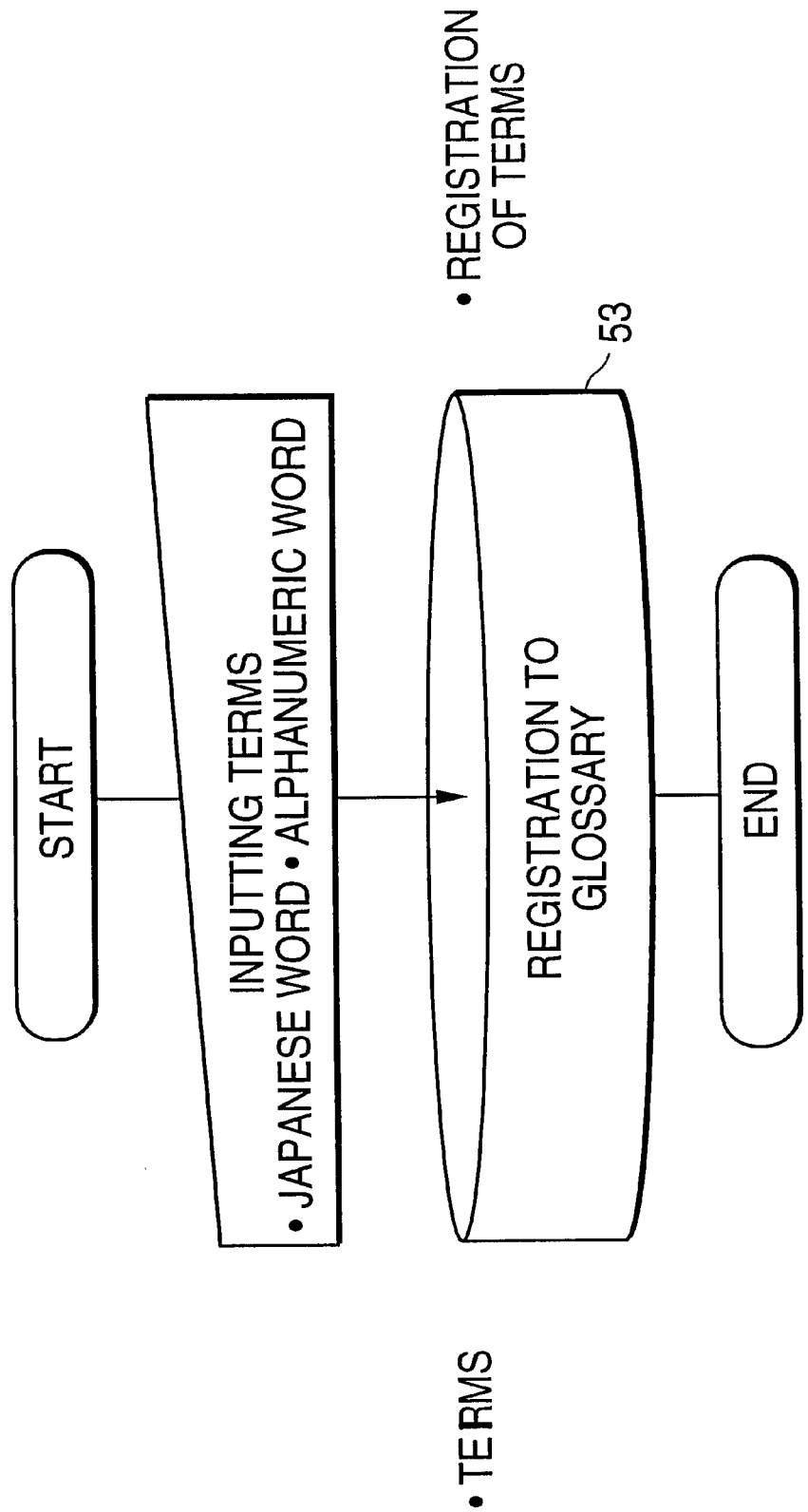
FIG. 6 is a schematic diagram showing a method for generating a glossary.

In FIG. 6, terms used for a transaction routine are input and registered to the glossary 53.

Figure 7:
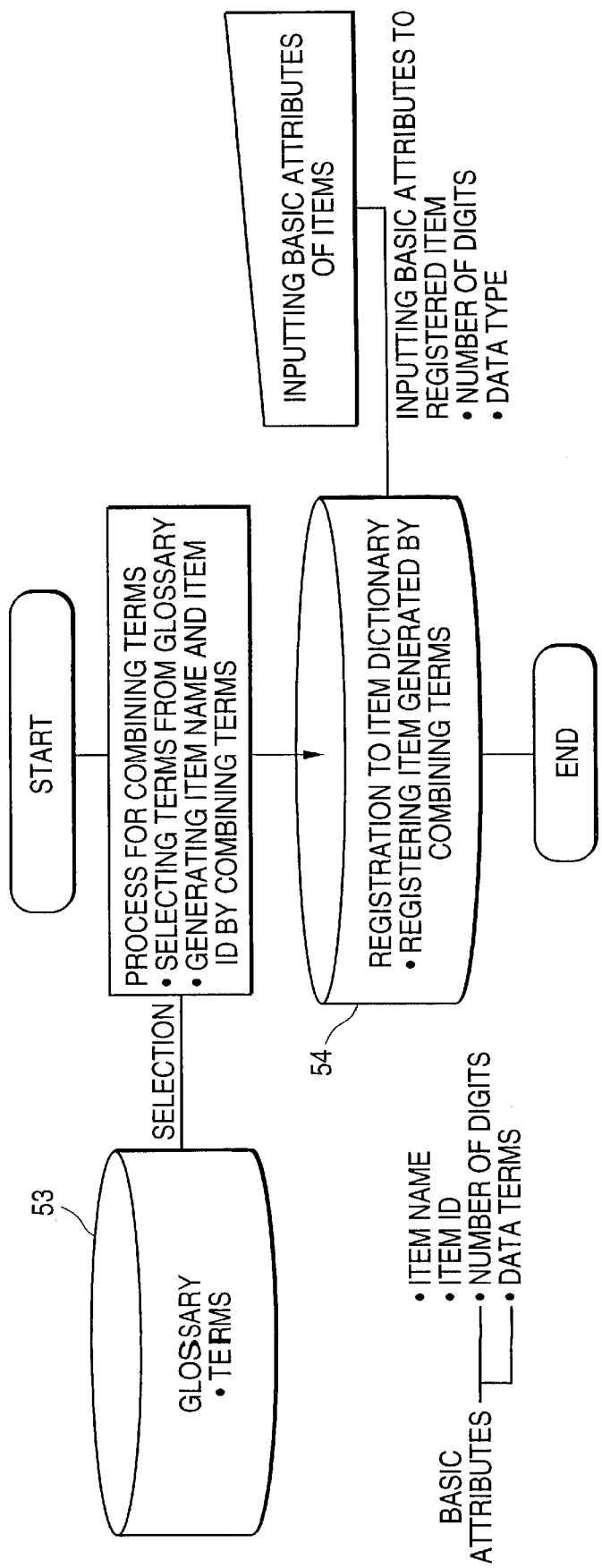
FIG. 7 is a schematic diagram showing a method for generating an item dictionary.

In FIG. 7, predetermined terms are selected from the glossary, and an item name and an item ID are generated by combining the terms, in a term combination process, so that the management of the item dictionary can be performed. The item name, item ID, basic attributes such as the number of digits, data type, etc., are registered to the item dictionary 54. At that time, the number of digits, data type, etc. are input to the item dictionary 54 as the basic attributes of each item.

FIG. 8 exemplifies the glossary 53, in which a term corresponds to a term ID.

FIG. 9 shows the structure of the item dictionary 54, in which there is a correspondence between an item name, item ID, the number of digits, and a data type. The number of digits indicates the number of digits of characters input as an item name, while the data type indicates whether input data is either a character type or a numeric type. The number of digits and data type are referred to as basic attributes. The item dictionary 54 is generated by combining terms selected from the glossary 53. For example, a process type "SYRKB" is generated by combining a process "SYR" and a type "KB".

Figure 10:
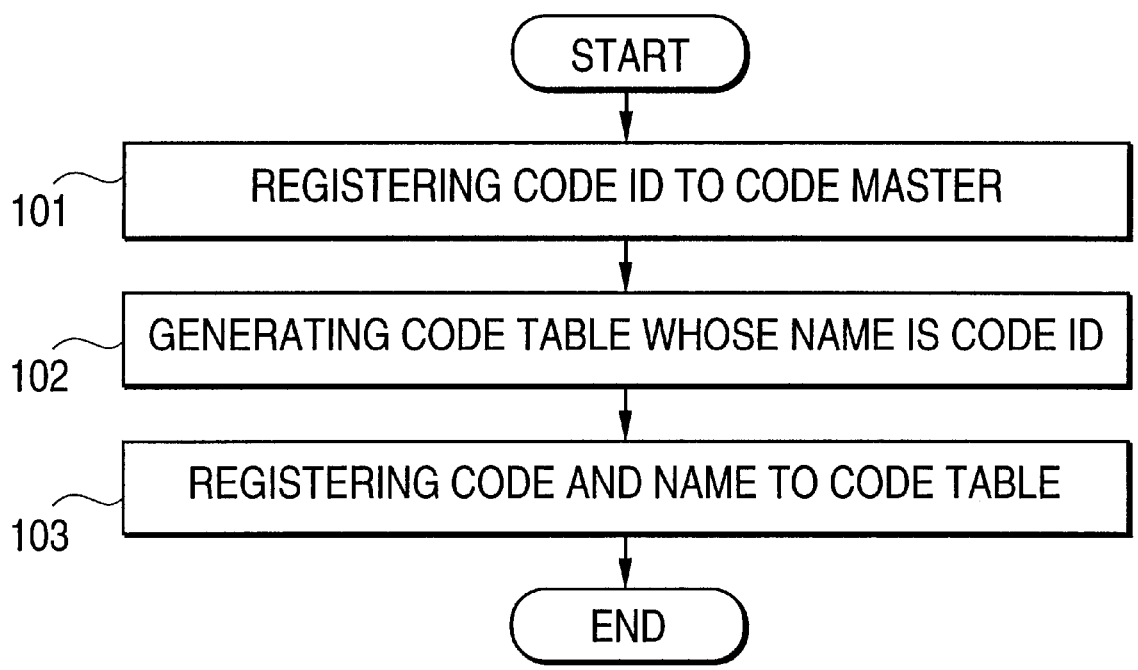
FIG. 10 is a flowchart showing a process for making a code design and generating a code table.
Figure 11:
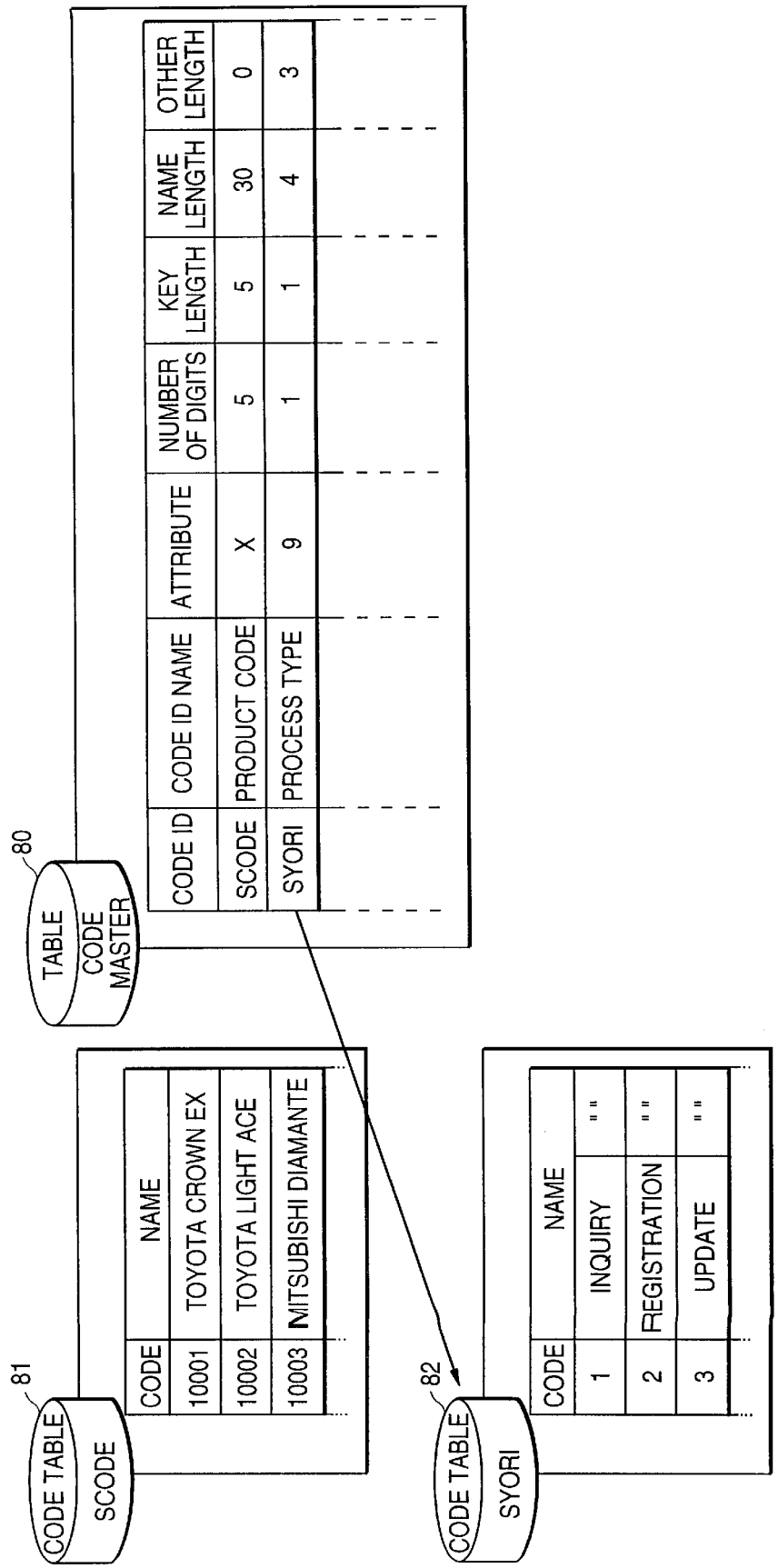
FIG. 11 is a schematic diagram showing a structure of the code table.

FIGS. 10 and 11 respectively show a flowchart of a method for generating a code design, and code tables.

In FIG. 10, an item which requires a more specific design among items input to a FORM is attached with a code ID, and registered to a code master 80 shown in FIG. 11, in step 101. A code ID, code ID name, attribute, the number of digits, key length, and a name length are written to each record in the code master 80. For example, a code ID name of a code ID "SYORI" is a process type. Then, code tables 81 and 82 are respectively generated by using the code IDs as table names in step 102. Corresponding codes and names are registered to the code tables in step 103. Assuming that the code ID of the code ID name "process type" is "SYORI", the codes in the table whose name is "SYORI" are 1, 2, and 3, and their names are "inquiry", "registration", and "update" respectively.

Figure 12:
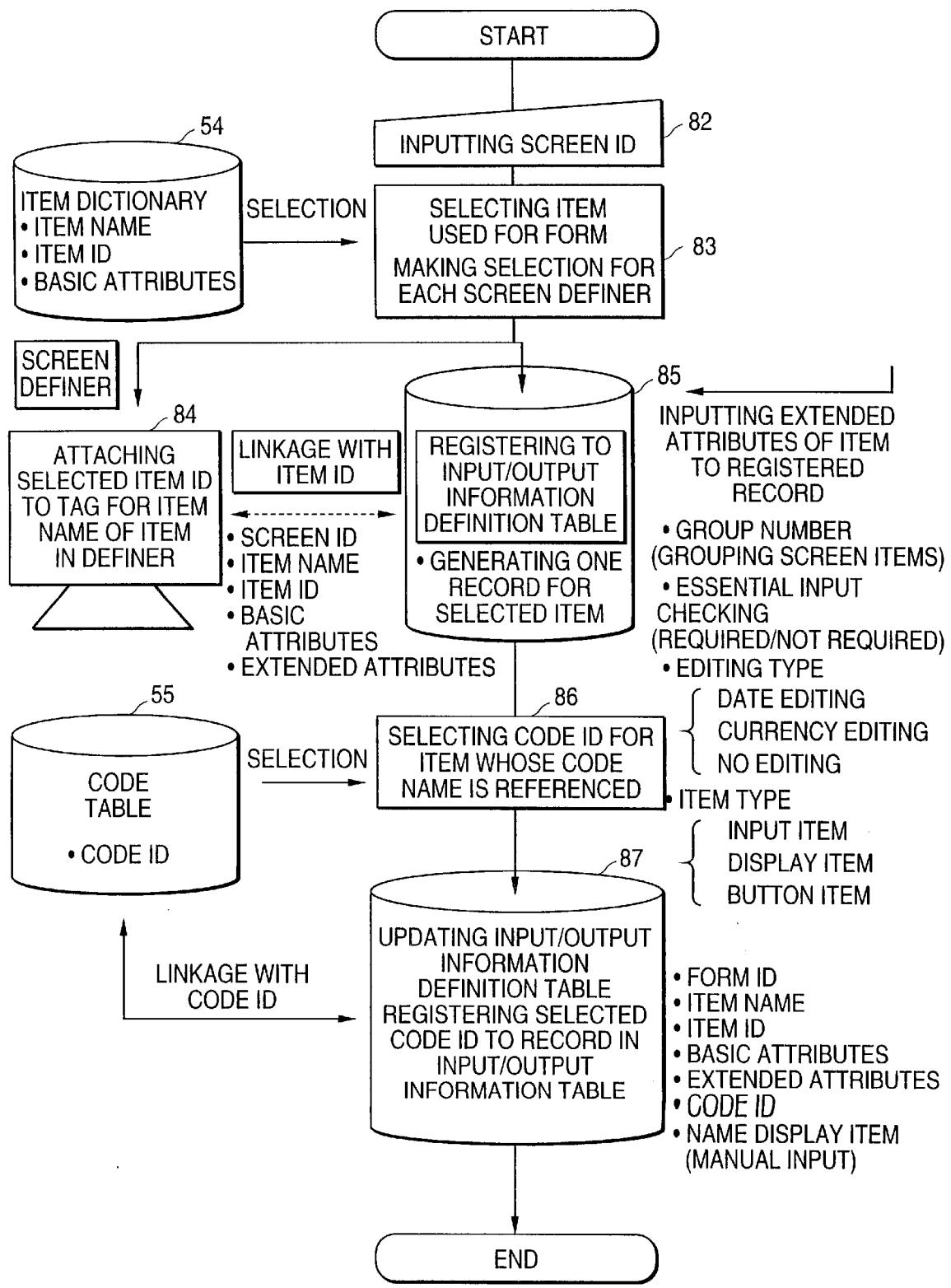
FIG. 12 is a flowchart showing a process for making an input/output information definition.

Provided below is the detailed explanation about the process for making an input/output information definition <item> shown in FIG. 2, by referring to the flowchart in FIG. 12. A screen ID (FORM ID) attached to each FORM is first input in step 82. Then, an item name, item ID, and basic attributes in a record are selected from the item dictionary 54, and all items to be used in the FORM are selected for each screen definer, in step 83. An item ID selected for an item name is assigned to a TAG in the screen definer (FORM) in step 84. At the same time, registration is made to an input/output information definition table 85 shown in FIG. 19, in correspondence with the screen definer, and a single record is generated for each of the selected items. A screen ID, item name, item ID, basic attributes, and extended attributes are selected, for example, from the item dictionary, and input to the single record in the input/output information definer. A group number (grouping of screen items), whether or not to check an essential input, an editing type such as date editing, currency editing, or no editing, or an item type such as an input item, display item, button item, etc., may be additionally input to the single record as the extended attributes. An item in the screen definer and a corresponding item in the input/output information definition table are linked with an identical item ID.

Figure 19:
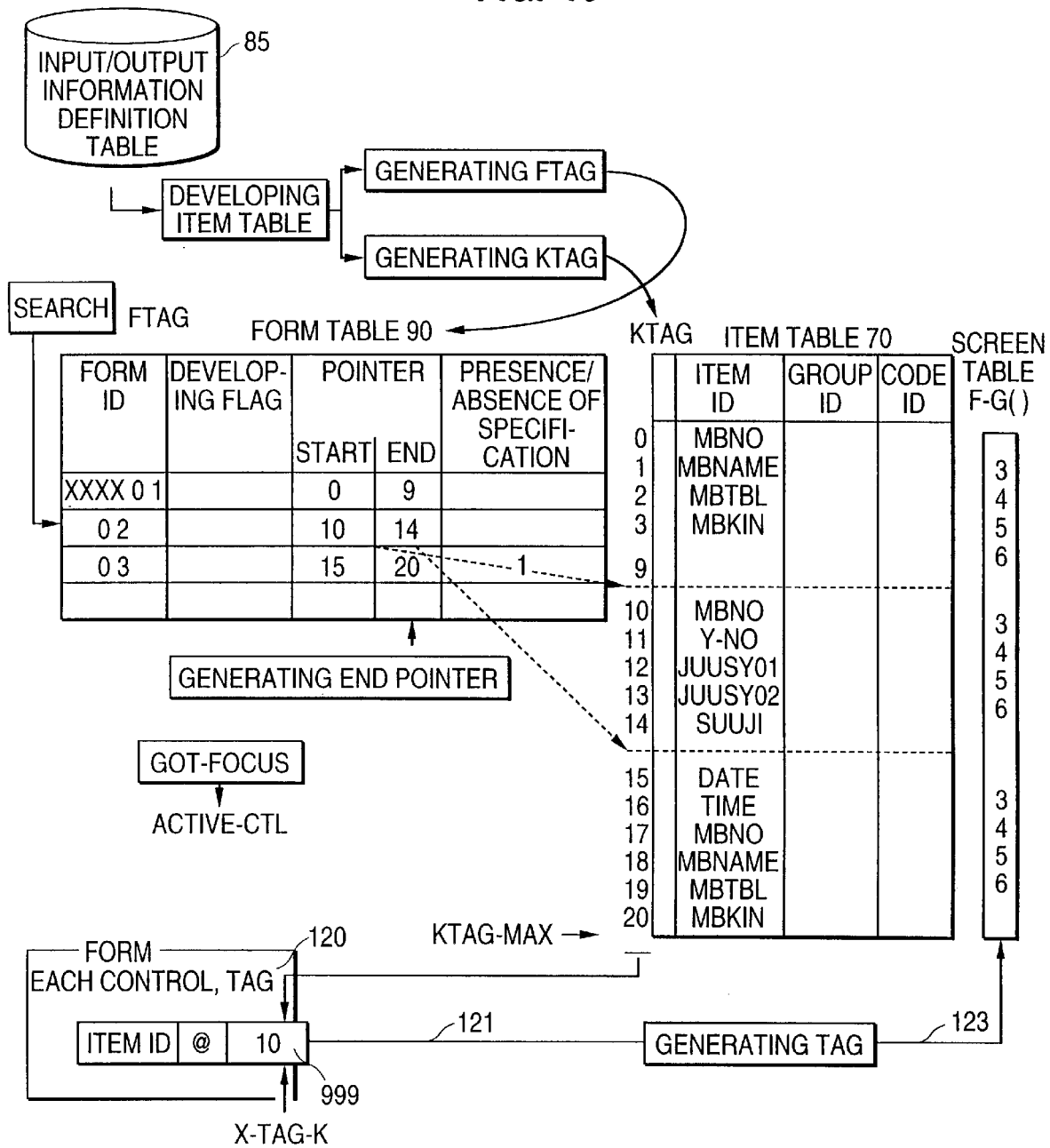
FIG. 19 is a schematic diagram showing table structures when a FORM helper performs an initial process.

For an item such as the process type, which references code names "registration", "modification", and "deletion" for codes 1, 2, and 3, a code ID is selected in step 86. The code ID to be selected is stored in the code table 55. The input/output information definition table 85 is then updated, and the selected code ID is registered to a record in the input/output information definition table 85, in step 87. That is, one record in the input/output information definition table 85 shown in FIG. 19 is composed of a form ID, item name, item ID, basic attributes, extended attributes, code ID, and a name display item which is manually input. Accordingly, the code table 55 and the input/output information definition table 87 are linked with an identical code ID, thereby referencing corresponding code and name included in the code table 55 from the input/output information definition table 87.

FIG. 13 exemplifies an input/output information definition table. This table is composed of, for example, a screen (FORM) ID, item name, item ID, the number of digits, data type, group ID, essentially of checking, editing type, item type, code ID, and a name display item. The screen ID, item name, item ID, the number of digits, and data type can be searched by the item dictionary, while the group ID, essentially of checking, and editing type are manually-input information. For the code ID, by way of example, "SYRKUBUN", and "TANTOU" are respectively selected from the code table 55 and input as the process type and responsible person code. The name display item is manually-input information, and an item name to be displayed next, for example, an item ID "SYRKBNM" of a process type name is manually input for the process type, or an item ID "TANNM" of the responsible person name is manually input for the responsible person code. The group ID, for example, partitions items on a screen into "head", "body", and "tail" groups, and restricts a cursor movement to within each group only. If the essentially of checking is "1", a checking routine must be made. Otherwise, the checking is not always required. For the editing type, "00" indicates no editing, "10" indicates a currency editing which puts, for example, "¥" or a comma, and "20" indicates the date editing which inserts a slash between a date and a month. The item type includes an input item, display item, and a button item.

FIG. 14 shows a message table. For a message ID "E001", a message "Terminate transaction" is displayed in correspondence with a predetermined group of head, body, and tail groups.

FIG. 15 shows a button table. For example, a button 1 indicates termination for a message of a button ID "B001". It corresponds to the PF1 key.

Figure 16:
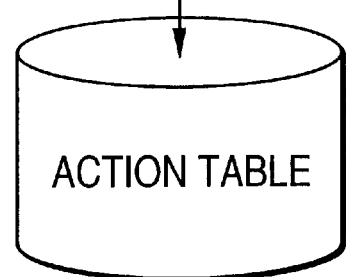
FIG. 16 exemplifies a table showing action of an input/output information definition.

FIG. 16 is a schematic diagram showing the input/output information definition <action> shown in FIG. 2. For a group 1 (head group) on a screen, a message of a message ID "E001", and a button name of a button ID "B001", are displayed in this figure.

Figure 17:
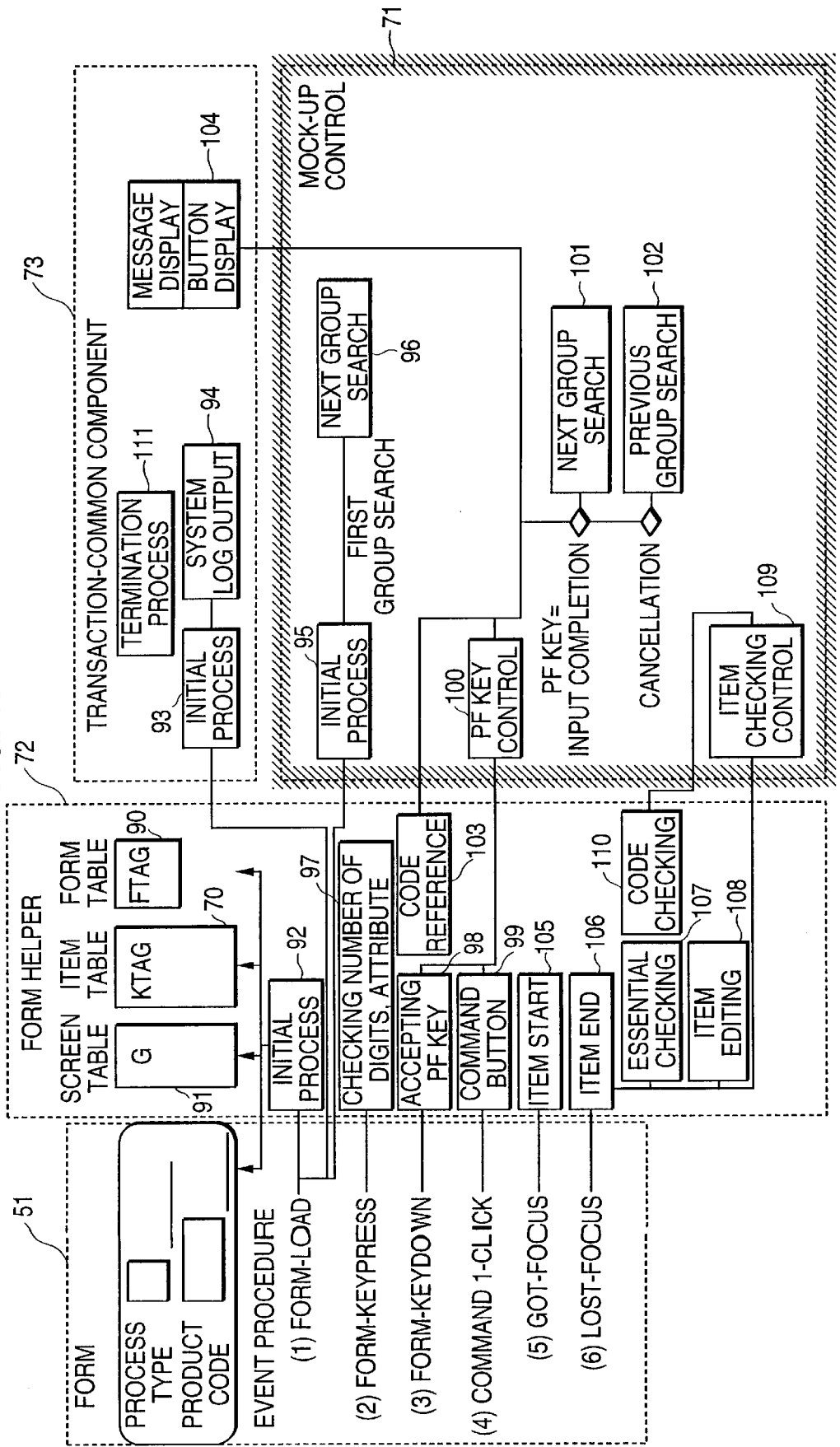
FIG. 17 is a simplified block diagram showing a configuration of a mock-up system.

FIG. 17 is a schematic diagram showing the configuration of a mock-up control system according to the present invention. The mock-up control system shown in this figure comprises a FORM 51 corresponding to a display screen, FORM helper 72 for controlling a display of the FORM 51, transaction-common component 73 which is a common routine used for controlling transaction routines, and mock-up control 71.

A process type, square region, product code, and a rectangular region are arranged in the FORM on a screen. The FORM helper 72 performs control while referencing an item table (KTAG) 70, FORM table (FTAG) 90, and a screen table (G) 91. The item table (KTAG) 70 stores design information read from an input/output information definition table. The FORM table (FTAG) 90 stores index information for grouping the item table into FORMs. The screen table (G) 91 stores a FORM item address which corresponds to an address in the item table.

Provided next is the explanation about a procedure in the case in which each event occurs by making an entry via a keyboard or by clicking a mouse. If a Form-Load event occurs as an event procedure (1), the FORM helper performs an initial process 92 for the FORM 51, screen table 91, item table 70, and FORM table 90. The transaction-common component 73 also performs an initial process 93, and a system log output 94. Then, a transaction skeleton correspondence unit in the mock-up control 71 performs an initial process 95, and a next group search 96 for searching a first group. If a Form-KeyPress event occurs as an event procedure (2), the FORM helper 72 makes checking of the number of digits and an attribute 97. If a Form-KeyDown event occurs as an event procedure (3), the FORM helper 72 accepts a PF key 98. If a Command-Click event occurs as an event procedure (4), the FORM helper 72 drives a command button 99. When the FORM helper accepts the PF key 98, or drives the command button 99, the transaction skeleton correspondence unit in the mock-up control 71 performs PF key control 100. In the mock-up control, the PF key control 100 makes a next group search 101 when an input is completed, while it repeats a previous group search 102 when the input is cancelled. The PF key control 100 may also sometimes make a code reference 103. Additionally, the PF key control 100 performs a message display or button display 104 using the transaction-common component 73.

When a cursor moves to a particular item as an event procedure (5), a Got-Focus event occurs, and the FORM helper 72 performs an item start 105. Then, an input required for an item is made to the FORM. When the cursor leaves that item, this cursor movement is recognized as a Lost-Focus event of an event procedure (6), which makes the FORM helper 72 perform an item termination 106. That is, the FORM helper 72 terminates the input to one item, and activates an essential input checking 107, and an item editing 108. Additionally, an item checking control 109 is activated in the transaction skeleton correspondence unit in the mock-up control 71. The item checking control 109 enables details of each item to be checked. Code checking 110 may be made after the item checking. Note that all of the above described event names, for example, are the event names of Visual Basic, and they will vary depending on a target language. Finally, the transaction-common component 73 performs a termination process 111.

Figure 18:
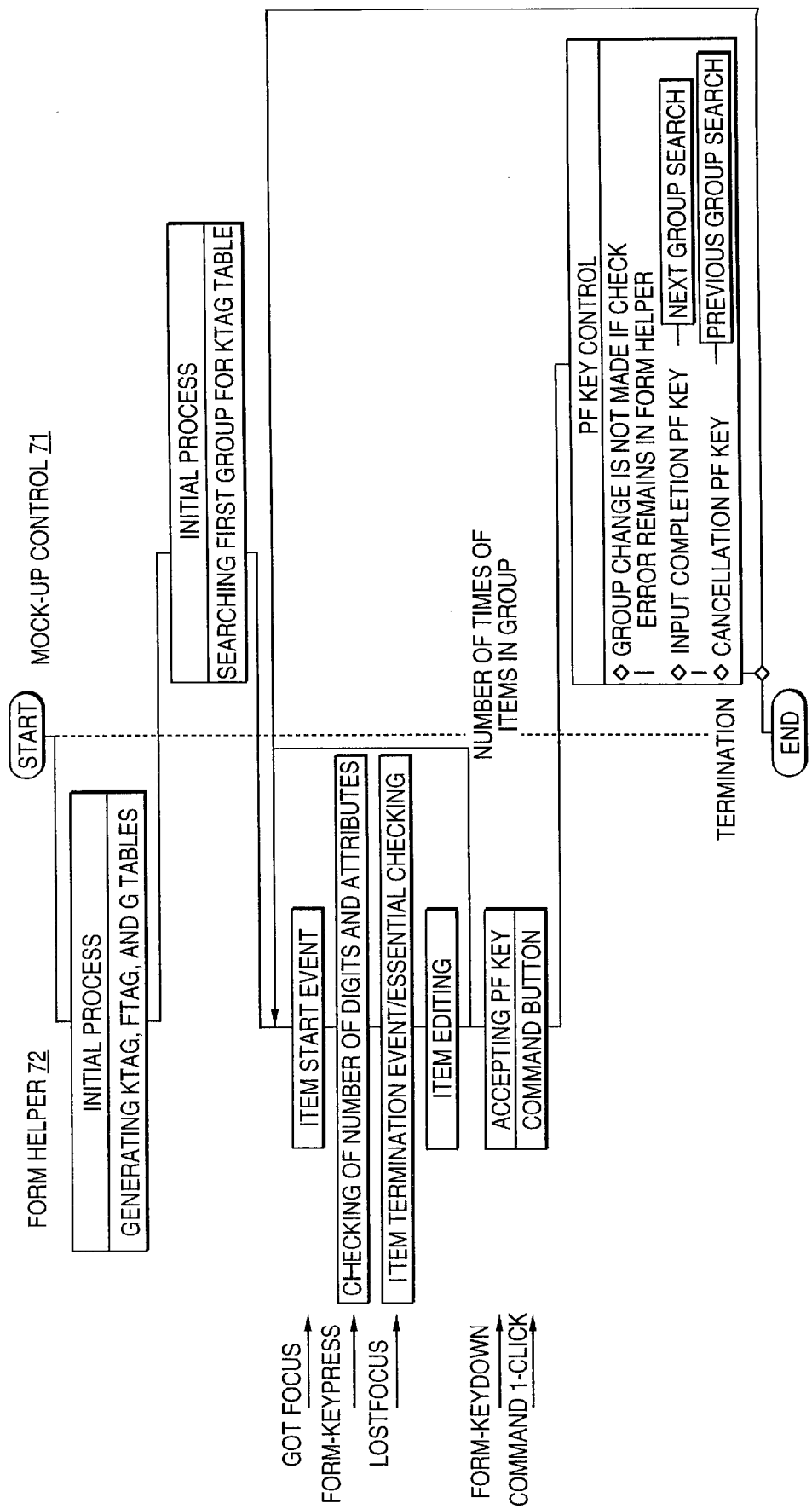
FIG. 18 is a flowchart showing a mock-up process.

FIG. 18 is a flowchart showing a mock-up control process. First of all, the FORM helper 72 is invoked to perform an initial process and generate an item table (KTAG), FORM table (FTAG), and a screen table (G). Control is then transferred to a mock-up control 71 to perform an initial process and search a first group for the item table.

Next, control is transferred to the FORM helper 72. The FORM helper 72 executes an item start event according to a Got-Focus event, and makes a checking of the number of digits and an attribute according to a Form-KeyPress event. The FORM helper 72 makes an essential input checking when an item termination event occurs according to a Lost-Focus event. The FORM helper 72 may additionally perform item editing. The FORM helper 72 repeats these operations for the number of times of items in each group.

Then, the FORM helper accepts a PF key according to a Form-KeyDown event, or allow an input from a command button according to a Command-Click event. Control is again transferred to the mock-up control 71. If a checking error made by the FORM helper remains, a group change is not made under a PF key control. The PF key control makes a next group search in the case of an input completion PF key, or makes a previous group search in the case of a cancellation PF key, and requests a group change of the FORM helper. With this process, a group change is apparently made according to a specified PF key. FIG. 19 is a schematic diagram showing the structures of tables when the FORM helper performs an initial process. The FORM helper first performs input operations to the input/output information definition table 85, and develops this table to generate an item table (KTAG) 70 and a FORM table (FTAG) 90. The item table 70 is composed of item IDs, group IDs, and other attributes. Its addresses are numbers in an array starting from "0" to the number of items such as "20". The item ID includes each item ID. The details of the group ID and other attributes are not referred to in this specification. The FORM table (FTAG) 90 attaches each of FORM IDs "01", "02", and "03" to each screen, in order to indicate to which address in the item table each screen corresponds. For example, since a pointer start and a pointer end are respectively "10" and "14" for a FORM ID "02", they correspond to a range from an array number 10 till an array number 14 in the item table for a second screen.

As described above, an item ID is detected by attaching a control TAG 120 onto each item on a screen and, by, for example, calling up the input/output information definition table 85 on the screen, and the detected item ID is assigned to the control TAG 120. The design process performs up to this operation.

That is, a system engineer assigns an item ID corresponding to a transaction routine to the control TAG 120 arranged in correspondence with a FORM item address on a screen when he or she makes a design. If a comparison is made between the item ID in the control TAG 120 and an item ID in the item table 70 as the initial process of the FORM helper, and if they match, a write operation 121 of the array number of the matching item ID such as "10", is performed on an area 999 next to the item ID of the control TAG 120. At the same time, a write operation 123 of a FORM item address corresponding to an item location on the screen is performed on a screen table 122. The screen table 122 is structured by arranging each area corresponding to each array number in the item table 70, as the process performed by the FORM helper. One item address such as "10" in the item table 70 is stored in the control TAG 120, and a FORM item address "3" is stored in one area in the screen table 122, which is pointed to by that control TAG 120. As a result, the control TAG 120 associates a location corresponding to the item in the FORM with one record in the item table corresponding to that item.

FIG. 20 shows details of the item table 70. The item table 70 is a table generated by removing the item name from the input/output information definition table shown in FIG. 13.

FIG. 21 is a flowchart showing the initial process performed by the FORM helper. This process is called only once at the beginning of program execution (including a mock-up control process). It is intended to link the item table with each item on a screen.

The FORM helper first performs input operations to an input/output information table, and develops the table into a KTAG (item table) and an FTAG (screen table) in step 130. After that, the FORM helper can reference the contents of the item table as variables in an array, that is, addresses in the item table.

The FORM helper then examines all of items on a screen. If an item ID is assigned to a TAG, the FORM helper performs the following two link operations in step 131. That is, the FORM helper determines whether or not an ID is assigned to a TAG of an array number "I" for each of the number of FORM items, for example, the FORM items 0 through 20, in step 132. If the item ID is assigned to the TAG, a comparison is made between the item ID assigned to the TAG and all items in the KTAG table in order to find a matching item ID, and an address of the matching item ID in the KTAG table is assigned to "J", in step 133. Then, the FORM helper sets the FORM item address in the screen table as (screen table (J)=I), and appends a KTAG index to the TAG, in step 134. That is:

FORM (I).TAG=FORM(I).TAG+STR(J)

As described above, an address in the screen table corresponding to an address in the item table is referenced, and data at a corresponding address in the item table is displayed at a FORM item address, when an entry is made from the item table to a predetermined area in the FORM. In the meantime, one particular address in the screen table storing a FORM item address is detected, and an address in the item table corresponding to that address is referenced using a TAG, in order to detect an item ID, etc. stored at the corresponding address in the item table, when the item table is referenced by one particular area in the FORM.

As described above, a location on a screen can be pointed to from the item table, or particular data in the item table can be pointed to from a particular location on the screen. This is because the item table and the screen table are mutually linked together.

The item and FORM tables are generated as part of the operations performed by the FORM helper during a mock-up control process. They are inherited from a design process to a manufacturing process together with the FORM and the FORM helper. A TAG to which an item ID is assigned is generated for each item, and is inherited from the design process to the manufacturing process.

The screen table is generated for each item to correspond a particular item address in the item table to a FORM item address on a screen in the initial process performed by the FORM helper, so that an address in the FORM can be pointed to from the item table, or data in the item table can be pointed to from a particular area in the FORM. Additionally, an assignment of an array number of the item table to a TAG is made for each item in the initial process performed by the FORM helper.

Figure 22:
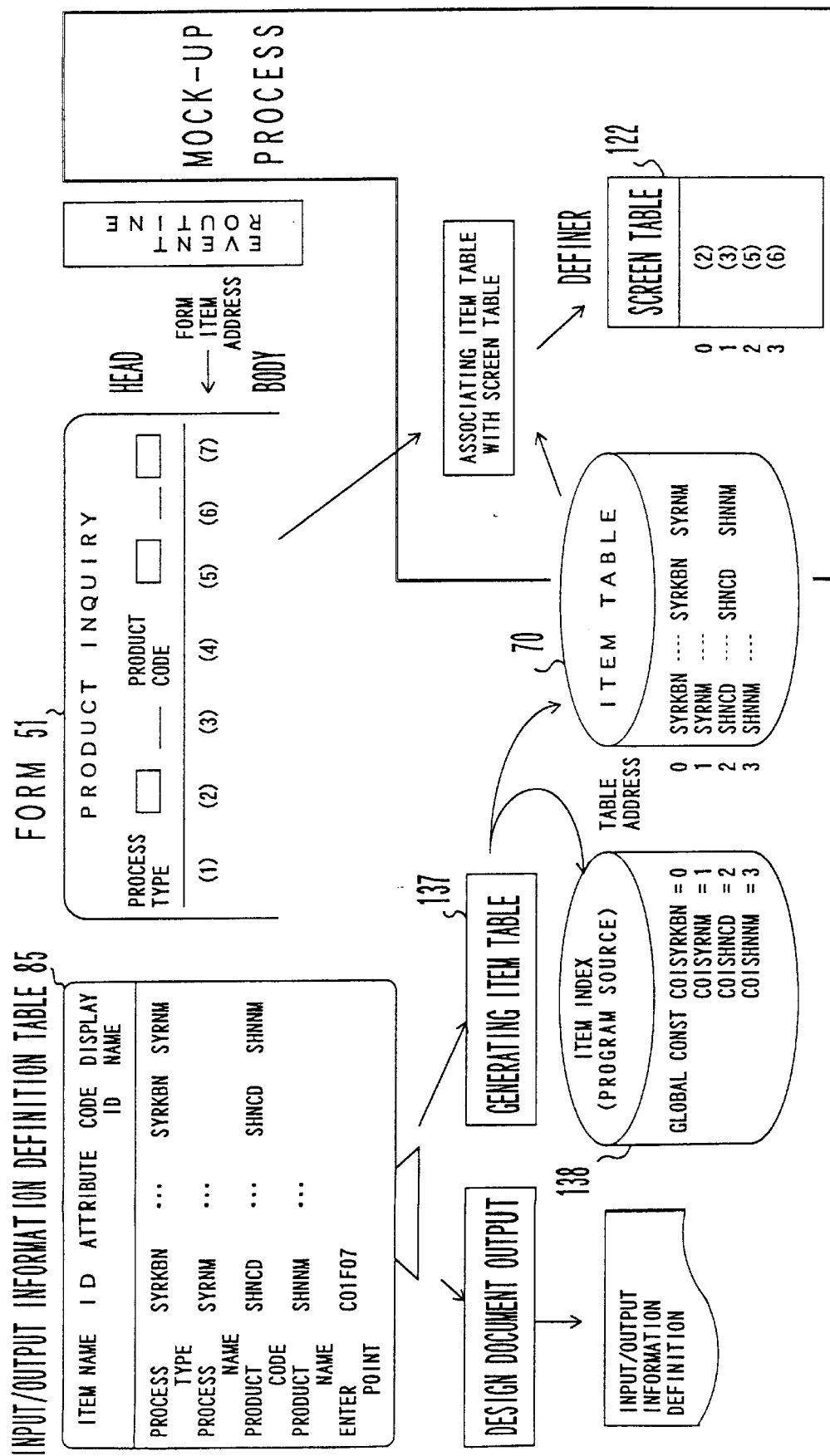
FIG. 22 is a schematic diagram showing a relationship between tables at the time of the process performed by the FORM helper.

FIG. 22 is a schematic diagram showing details of a mock-up process. First of all, a screen layout is generated in a FORM of Visual Basic. For example, a system engineer arranges a process type, rectangular region, underscore, product code, rectangular region, and an underscore for a product inquiry, by using the FORM capability, as shown in the FORM 51.

When a screen of the input/output information definition table 85 is called, data such as an item name, item ID, attribute, code ID, and display name are displayed on that screen. If the input/output information definition table 85 does not include an item to be input to the FORM, such as the process type, an item dictionary (not shown in this figure) is further displayed. When the process type is selected from the item dictionary, the process type, "SYRKBN", . . . are respectively displayed as an item name, ID, and attribute on the screen of the input/output information definition table 85. Then, a code ID file is displayed to select a code ID corresponding to the process type, and "SYRKBN" is displayed in the input/output information definition table 85. If an item name to be input to a next column, for example, an ID of a process name "SYRNM", is manually input, the process name of the next item is displayed as a display name, when the code of the process type is input on a screen. Similarly, when a process name, product code, and product name are required to be input to a FORM so as to generate a transaction routine satisfying system requirements, they are selected from the item dictionary, and input to the input/output information definition table 85 and displayed there.

Next, an item table 70 which is almost the same as the input/output information definition table 85 is generated, based on the input/output information definition table at the time of executing the mock-up control process. An association is made between the item table 70 and the screen table 122, based on the item table and a TAG, which is not shown in this figure, and arranged for each item on a screen. Note that the input/output information definition may also be output and printed out as a design document as it is.

In item table generation step 137, data "SYRKBN, . . . , SYREBN, SYRNNM" in a first line in the input/output information definition table 85 are registered at an address "0" in the item table 70, and an item index 138 is generated. The item index 138 is used by a transaction routine in a manufacturing process. Not table addresses "0", "1", "2", and "3" in the item table 70, but corresponding indexes are written in a source program, thereby improving the association and visibility of each item information stored at each address.

Provided next is the explanation about a mock-up process which is the core of the present invention.

A process type of an item ID "SYRKBN" is stored at the address "0" in the item table 70, while an address (2) of the item ID "SYRKBN" is stored at an address "0" in the screen table 22 corresponding to the screen information. Accordingly, a correspondence between the item table and the FORM on a screen is made in the screen table. Assume that a system engineer first generates the screen of the FORM 51 and required design information in order to design a product inquiry program. If a user or the system engineer displays the FORM 51 on a screen and inputs a code 1 to the rectangular region of the item address next to the process type in this case, the FORM helper checks the number of digits of that code, its attributes, etc. If the result is an error, the FORM helper displays a message conveying the error. If the result is correct, the FORM helper searches for the code table, and displays the name "registration" at a next FORM item address (3). Accordingly, the user can review or consider his or her desire, design, or design change by watching movements on the screen as if a program were running, although the program has not been completed. This is because some kind of output appears in the FORM in response to the code input 1. As a result, the user can notify the system engineer of his or her desires or change requirements. The above provided explanation referred to the process type. However, the required item information on a screen may be associated with the item table. An address in the item table can be determined according to each item on the screen, while a location on the screen can be determined according to the item table.

Then, a group of common subroutines using table addresses as parameters is generated to automate an attribute checking, etc., so that the mock-up process is implemented. Note that a data entry can be inherited by executing checking routines although each mock-up operation is not shown in the drawings.

Provided below is the explanation about checking made by the FORM helper such as a checking of the number of digits, checking of an attribute, and a checking of a code reference code. With these checking operations, a user can make an entry on a screen by using a mock-up of a program, as if the program were actually running at a stage at which a system engineer has not yet completed the program.

Figure 23:
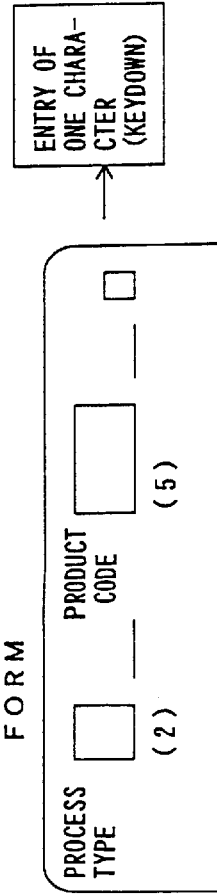
FIG. 23 is a schematic diagram explaining an attribute checking.

FIG. 23 shows a process for automatically checking an attribute in order to use a data entry in a mock-up process.

Assume that a process type and a product code are displayed in a FORM on a screen. In an event routine, checking of an attribute, checking of the number of digits, and automatic tabulation (to a next field) are performed as a checking of a one-character entry, that is, a checking of a keyboard entry. For item input completion (Lost-Focus event), checking of an essential input, editing display, and checking of code are performed. The item table includes a process type or a product name as an item name, and required attributes. The number of digits, automatic tabulation, essential input, code ID, display item ID, etc. are included as the attributes in the table. The screen table includes FORM item addresses (2) and (5) which respectively correspond to the process type and product code.

Figure 24:
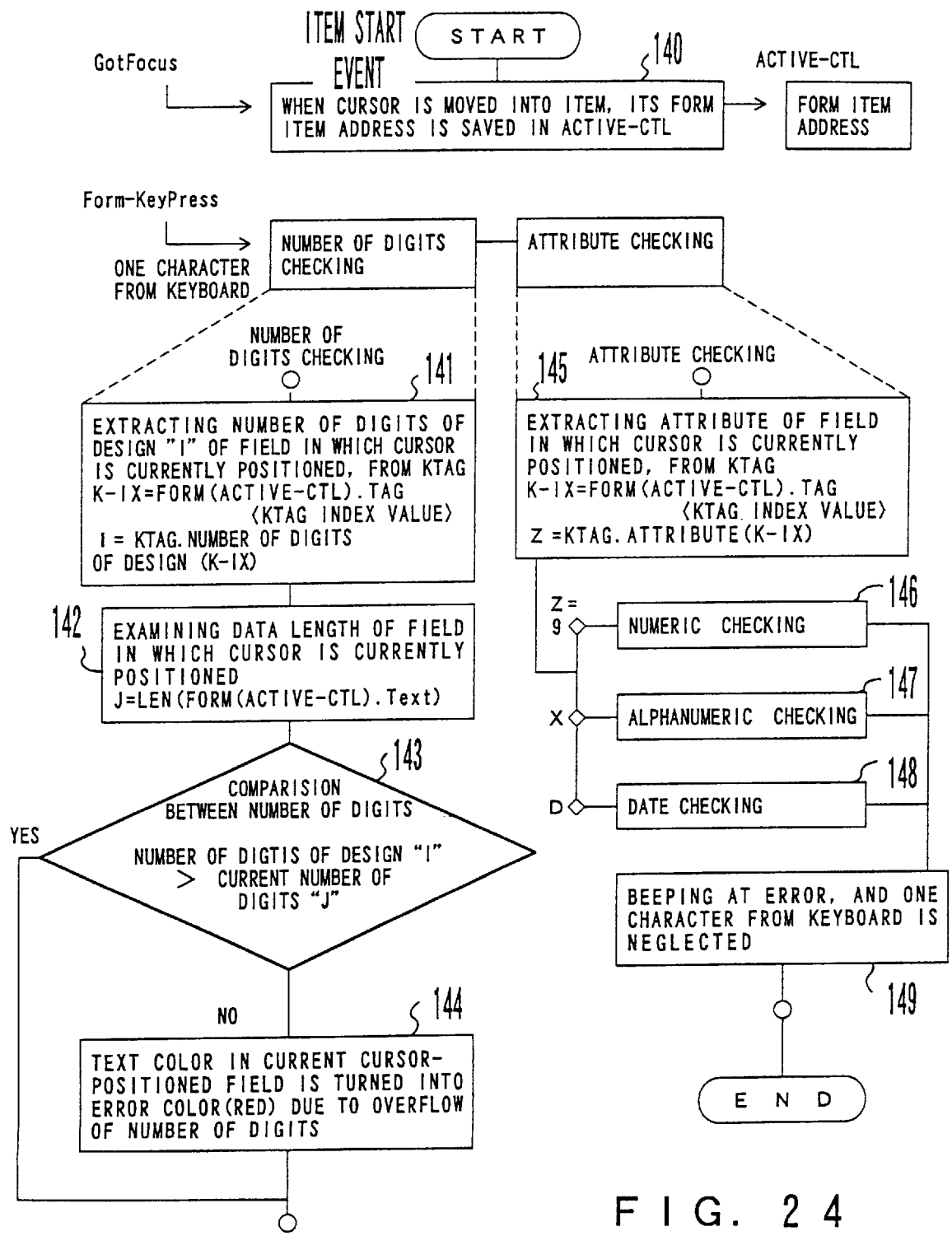
FIG. 24 is a flowchart showing processes for checking the number of digits and attributes.

FIG. 24 is a flowchart showing a process for checking the number of digits and attributes. A Got-Focus event drives an item start event, which stores a FORM item address in an ACTIVE-CTL when a cursor is moved into an item, in step 140. When a Form-KeyPress event occurs due to a one-character entry from a keyboard, the checking of the number of digits is made. The routine for checking the number of digits first extracts an address in an item table, that is, a number in an array K-IX from a KTAG index of a TAG, based on a field in which the cursor is currently positioned in the FORM, extracts the number of digits of a design "I"

from the K-IX address in the item table, in step 141, and examines a data length "J" (the current number of digits) of the field in which the cursor is currently positioned, in step 142. Next a comparison is made between both of the numbers, and the process steps through if the number of digits of the design "I" is larger than the current number of digits "J", in step 143. If the number of digits of the design "I" is not larger than the current number of digits "J", a text color in the field at which the cursor is currently positioned is turned into an error color (red) due to an overflow of the number of digits in step 144.

When the routine for checking attributes is driven by the Form-KeyPress event, the attributes of the field in which the cursor is currently positioned are extracted from the item table KTAG in step 145. A numeric checking, an alphanumeric checking, and a date checking are respectively performed in steps 146, 147, and 148. When an error is detected, a beep is emitted and one character input from a keyboard is neglected in step 149.

Figure 25:
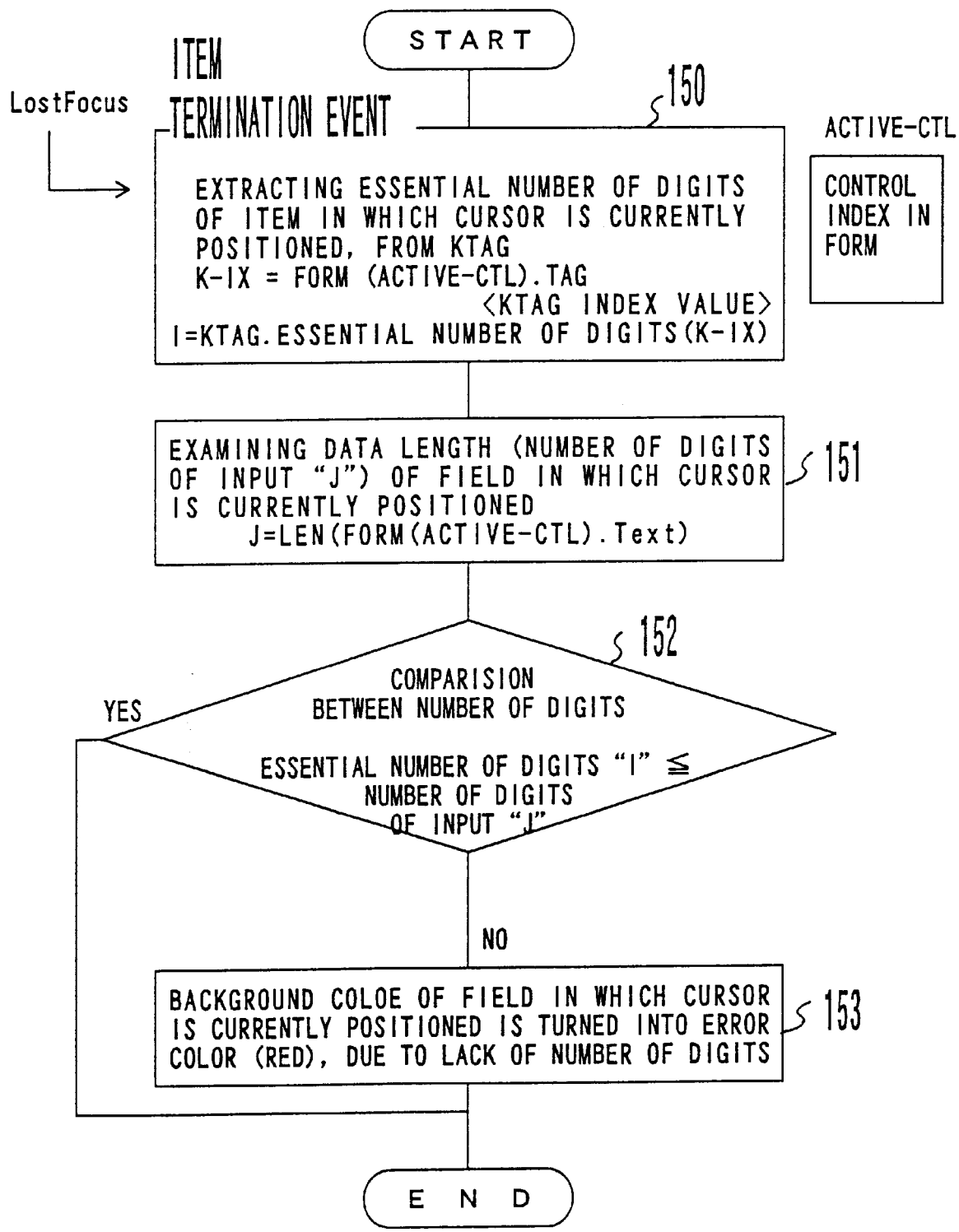
FIG. 25 is a flowchart showing a process for checking an essential input.

FIG. 25 is a flowchart showing a process for checking an essential input. When a Lost-Focus event occurs, an item termination event is driven to extract essential number of digits "I" of an item at which a cursor is currently positioned from the item table KTAG in step 150. Then, a data length (the number of digits of an input "J") of a field in which the cursor is currently positioned, is examined, in step 151. A comparison is made between both of the numbers in step 152. If the essential number of digits "I" is equal to or smaller than the number of digits of the input "J", the process is terminated. This is because this result indicates that an input is made to an essential input item. In the meantime, if the essential number of digits "I" is larger than the number of digits of the input "J", a background color of the field in which the cursor is currently positioned is turned into an error color such as red due to the lack of the essential number of digits, in step 153.

FIG. 26 exemplifies an item editing. If a value "123456" is input, it is edited and displayed as "123456", "123,456", or "¥123,456", depending on an editing ID such as "00" (no editing), "22" (numeric editing), or "32" (currency editing).

If a value "19960101" is input, it is displayed as "1996/01/01" on the condition that the editing ID is a "date editing". This mechanism is implemented by saving a value prior to editing at the end of a tag of each item, and displaying a value after editing in a screen text area. The original value appears by displaying the saved contents of the tag in the screen text area at a timing of the item start event.

Figure 27:
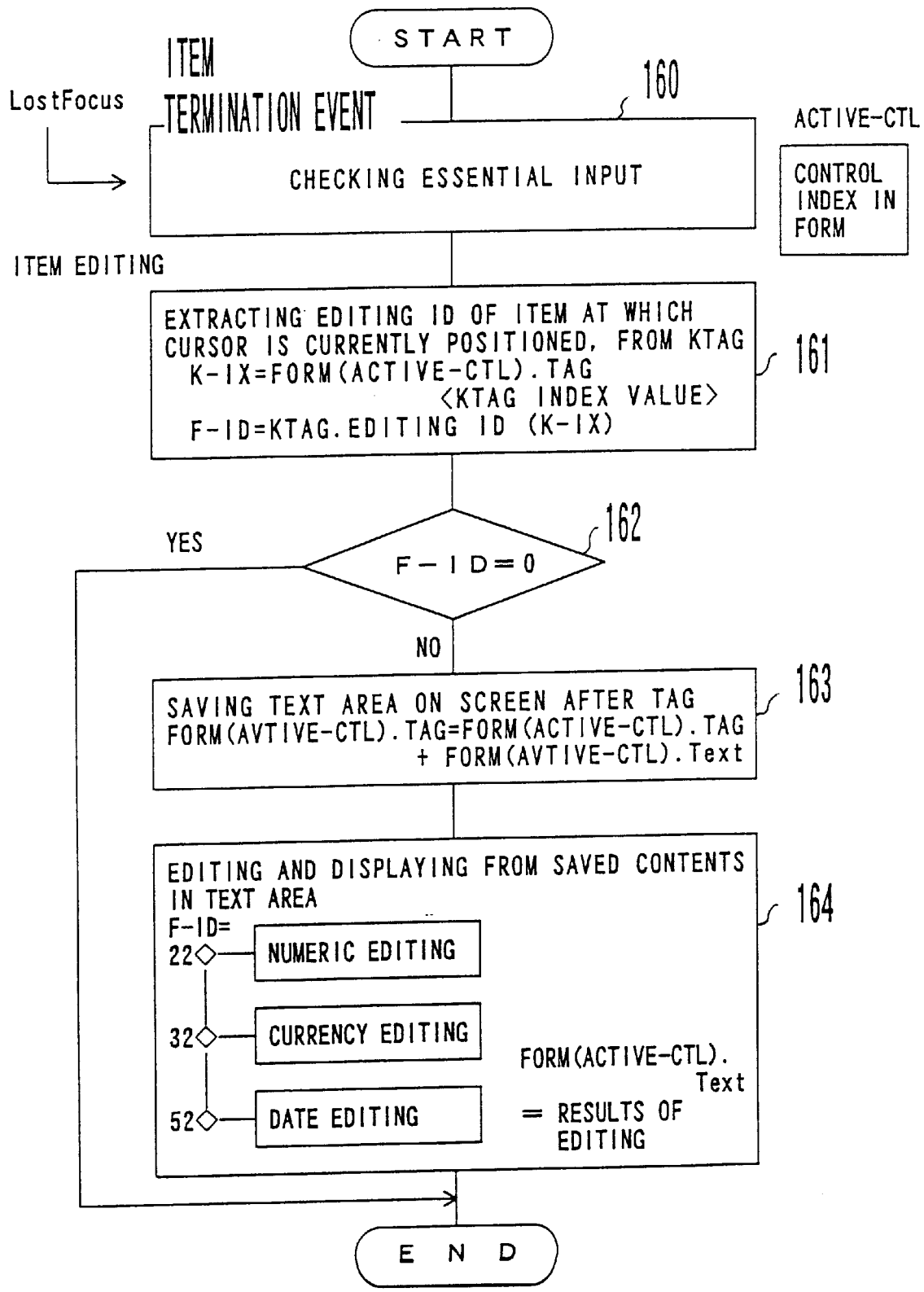
FIG. 27 is a flowchart showing a process for editing an item.

FIG. 27 is a flowchart showing an item editing process. When a Lost-Focus event occurs, an item termination event is driven to check an essential input in step 160.

Then, an editing ID of an item at which a cursor is currently positioned, is extracted from the item table KTAG, in order to perform item editing in step 161. If no editing ID exists, the process is terminated in step 162. If any ID exists, a screen text area is saved after a tag is attached in step 163. Corresponding editing is displayed in the screen text area based on the saved contents, so that the numeric editing, currency editing, or date editing, etc. is performed in step 164.

Figure 28:
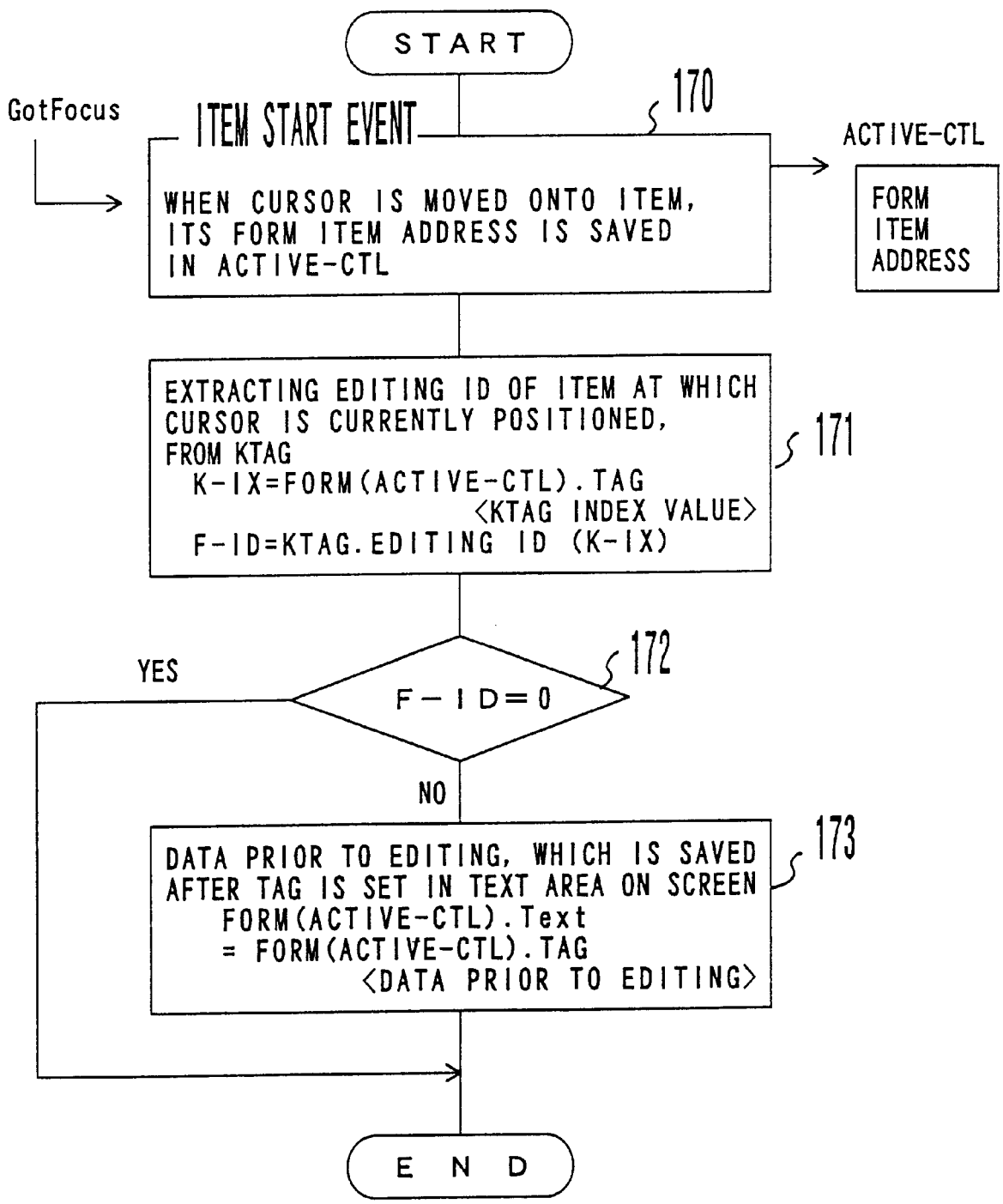
FIG. 28 is a flowchart showing a process for cancelling the process for editing an item.

FIG. 28 is a flowchart showing a process for cancelling an item editing.

If a Got-Focus event occurs, an item start event is driven to save a FORM item address in an ACTIVE-CTL when a cursor is moved onto the item, and the ACTIVE-CTL holds that address, in step 170.

Then, an editing ID of an item at which a cursor is currently positioned is extracted from the item table KTAG in step 171. If no editing ID exists, the process is terminated in step 172. If any editing ID exists, the item editing process is cancelled by setting data prior to the editing, which is saved after a tag, in a screen text area, in step 173.

According to the present invention, if a system engineer inputs, for example, "1" to a rectangular region following a process type on a screen while referencing a code ID table of the process type, in order to show a user that screen, at a design stage of a program, and if the number of digits of that input is correct, the process goes to the next step. If the number of digits of the input is incorrect, the text color is turned into an error color. Accordingly, the system engineer can input data and display it on a screen as if the program were completed, although it is not actually manufactured. Additionally, the user can request the system engineer to add a modification to the specification of the program at that time, and therefore a program satisfying the user desire can be designed.

Figure 29:
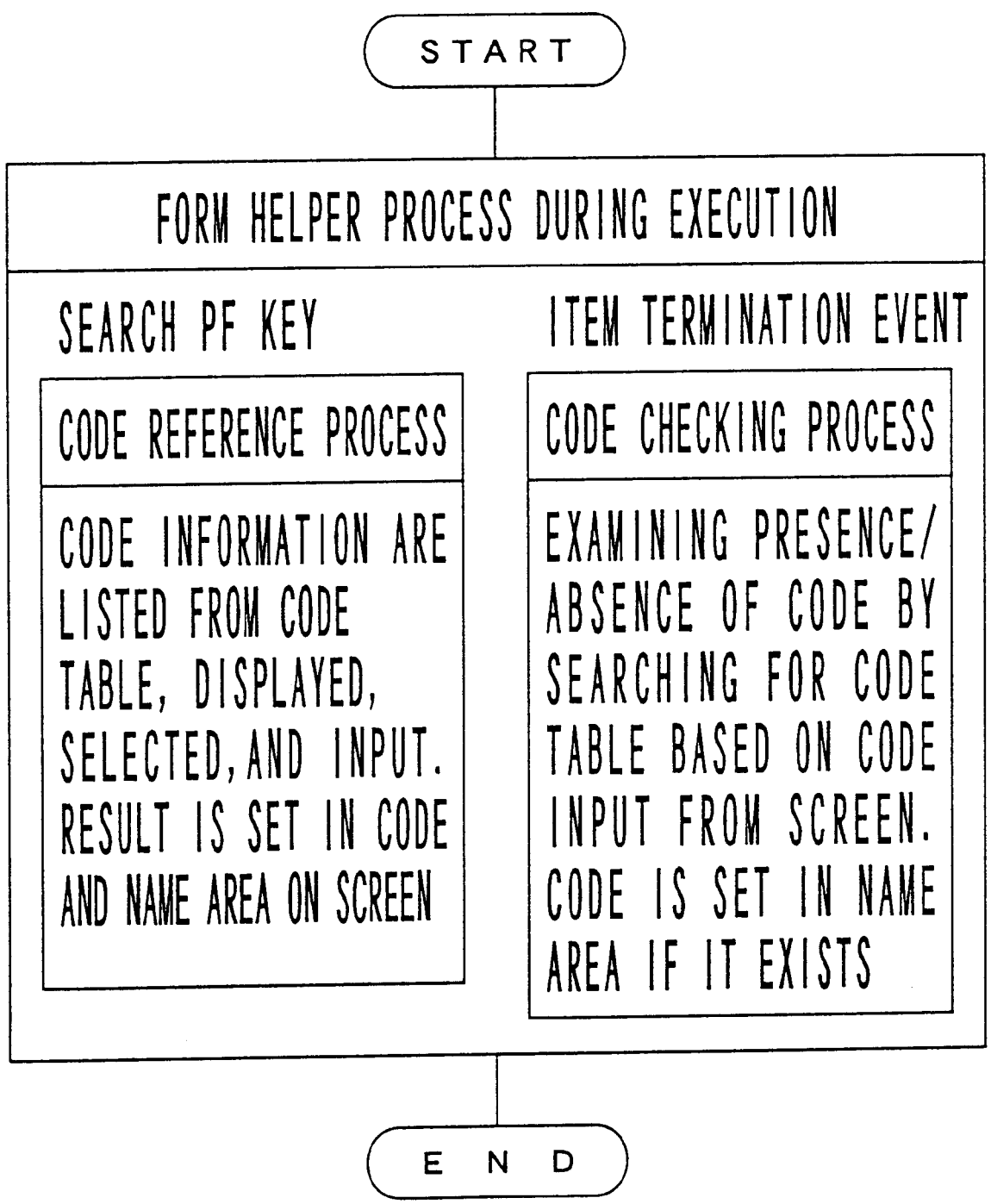
FIG. 29 is a flowchart showing an entire process for referencing and checking code.

FIG. 29 is a flowchart showing a process for referencing and checking code.

Provided below is the explanation about a FORM helper process during execution. This process includes two types. One type is a process for referencing code, according to a search PF key input. With this process, code information are listed, selected, and input from a code table, and the result is set in code and name areas on a screen.

The other of the two performs a process for checking code. With this process, an item termination event examines whether or not a code exists by searching for the code table, based on the code input on a screen. If it exists, its name is set in a name area.

FIG. 30 is a flowchart showing the process for referencing code performed by the FORM helper.

If a Got-Focus event occurs, an item start event is driven to save a FORM item address in an ACTIVE-CTL when a cursor moves onto the item, in step 180.

Next, if a Form-KeyDown event occurs, a PF key is accepted in step 181. If the PF key is not a search PF key, the process is terminated in step 182. If the PF key is the search PF key, a code ID of a field at which a cursor is currently positioned is extracted from the item table (KTAG), in step 183. This extraction operation is implemented as follows.

K-IX=FORM(ACTIVE-CTL).TAG <KTAG index value> code ID=KTAG.code ID(K-IX)

Then, the code ID is input to a code table as a file name in step 184, and a code listing window is displayed in step 185.

One line is selected from the listing using a mouse, etc. in step 186.

Next, code and name in the selected line are extracted in step 187.

The extracted code is arranged from the beginning of the line by the number of digits of key length, while the extracted name is the number of digits of name length and arranged from the number of digits of key length+1 digit.

Figure 31:
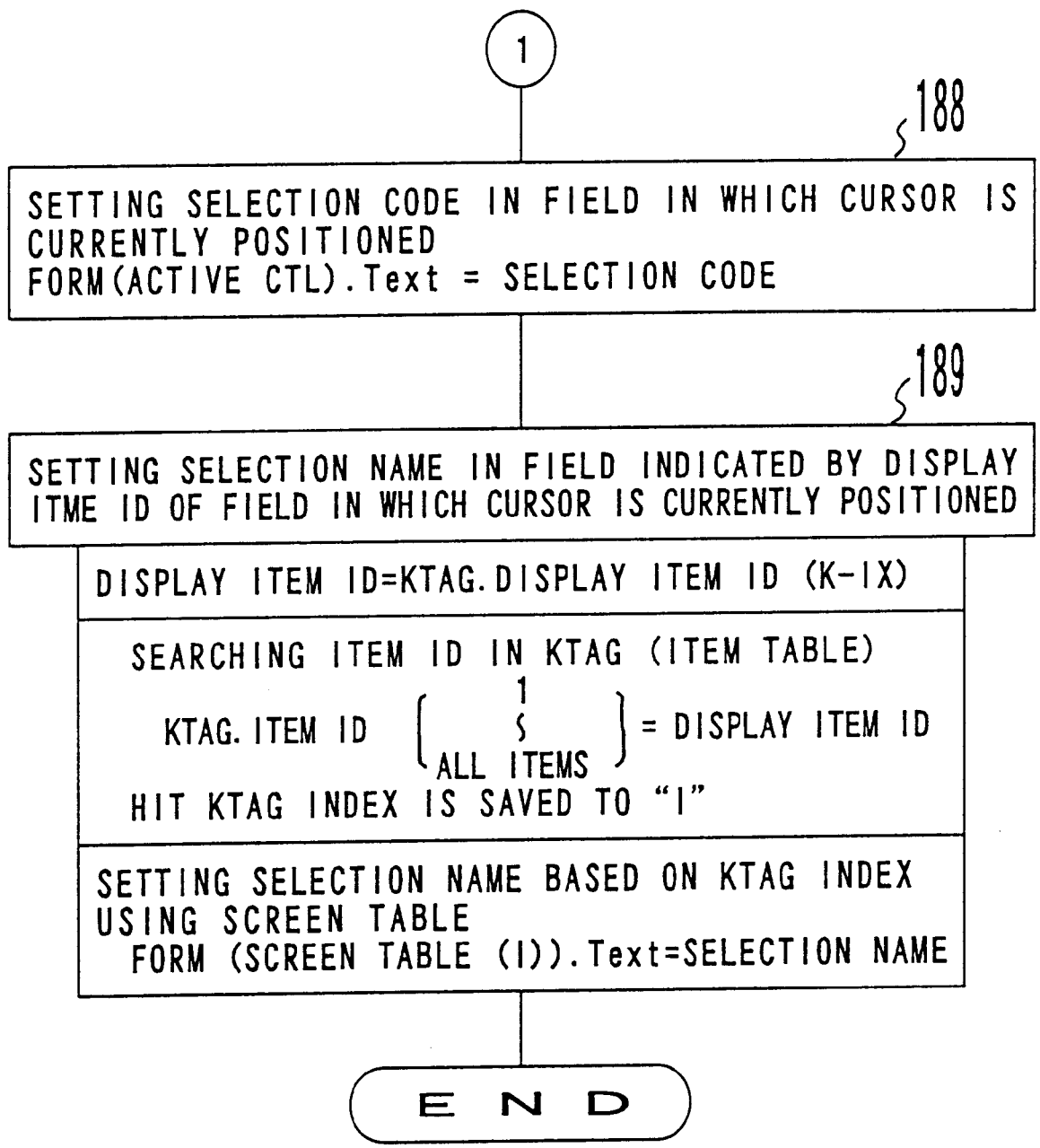

The extracted code is then set in the field at which the cursor is currently positioned, and displayed on a screen, in step 188 of FIG. 31.

FORM(ACTIVE-CTL).Text=extracted code

In the meantime, the extracted name is set in a field indicated by a display item ID of the field in which the cursor is currently positioned on the screen, in step 189.

That is, the FORM helper searches an item ID of a display item ID=KTAG.display item ID (K-IX) of KTAG (item table) for all items. As a result:

KTAG.item ID(1–all items)=display item ID

A searched KTAG index is input to an "I".

Then, the extracted name is set by using a screen table, based on the KTAG index.

FORM(screen table(I)).Text=extracted name

That is, the screen table is referenced using an address in the item table (KTAG) corresponding to the extracted name, and the extracted name stored at the FORM item address is displayed. With these operations the extracted name can be displayed, for example, in an item next to a code item in the FORM.

Figure 32:
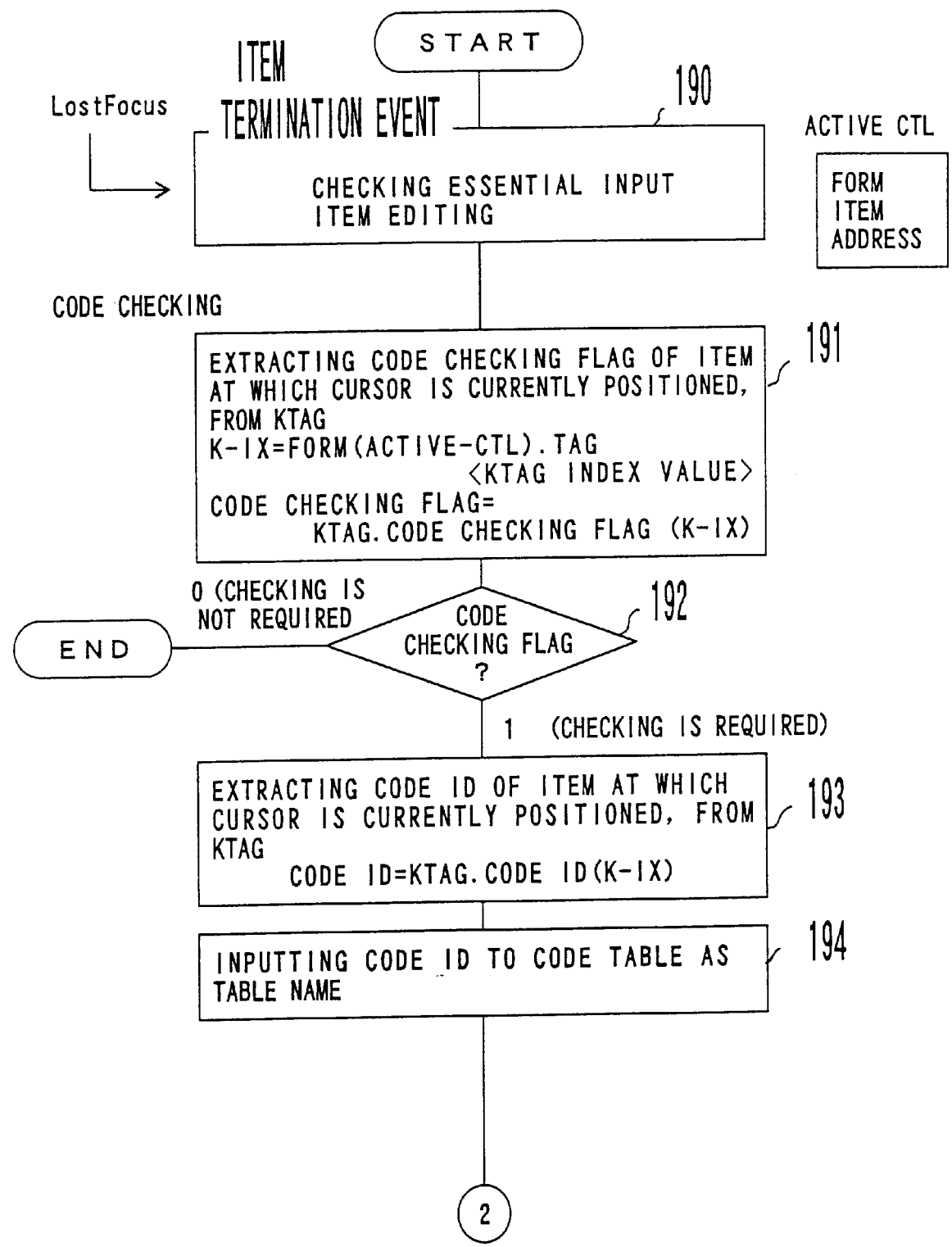
FIGS. 32 and 33 are flowcharts showing a process for checking code performed by the FORM helper.

FIG. 32 is a flowchart showing a process for checking code performed by the FORM helper.

If a Lost-Focus event occurs, an item termination event is driven to check an essential input and perform item editing, in step 190. Next, a code checking flag of an item at which a cursor is currently positioned, is extracted from the KTAG, in order to make a code checking, in step 191. These operations are implemented as follows.

K-IX=FORM(ACTIVE-CTL)TAG <KTAG index value> code checking flag=KTAG.code checking flag (K-IX)

If the code checking flag is "0" (indicating that no checking is required), the process is terminated. If it is "1" (indicating that checking is required), a code ID of the item at which the cursor is currently positioned, is extracted from the KTAG in step 192, according to the following.

code ID=KTAG.code ID(K-IX)

Figure 33:
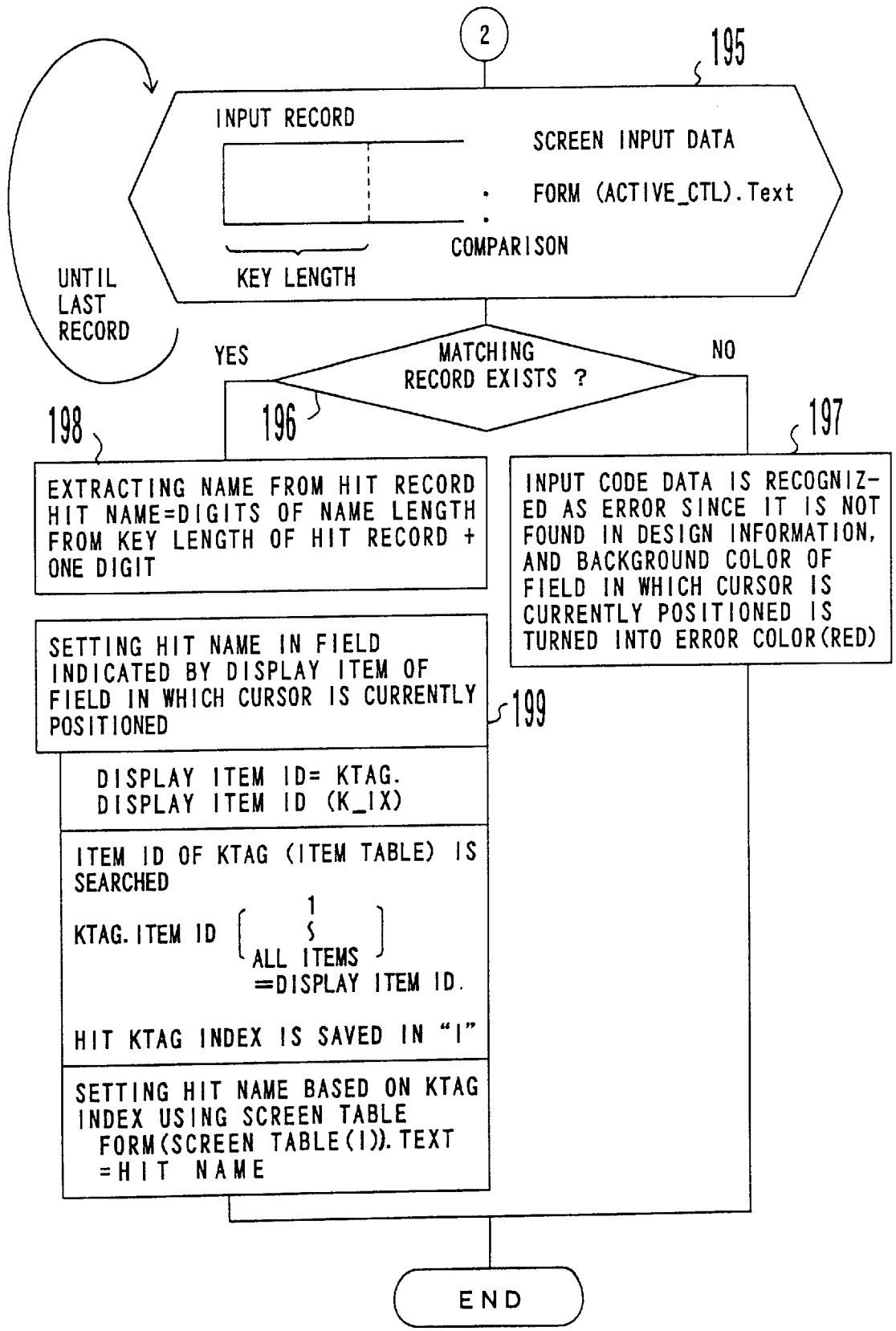

The code ID is then input to the code table as a table name in step 194. Then, a comparison is made between data of the item at which the cursor is currently positioned, and the contents of the table as shown in FIG. 33, in step 195.

In step 196, it is determined whether or not a matching record exists. If no matching record exists, the data of the item is recognized as an error. This is because the input data is not found in the design information. The background color of that field is turned into an error color (red) in step 197.

If a matching record exists, its name is extracted from the record in step 198.

The extracted name is set in a field indicated by the display item ID of the field in which the cursor is currently positioned in step 199. That is, a search is made for item IDs in the KTAG (item table).

As a result, KTAG.item ID (1–all items)=display item ID, and the matching KTAG index is input to an "I". That is, the matching name is set by using the screen table based on the KTAG index, according to the following:

FORM(screen table(I)).TEXT=matching name

If code input to a screen exists in a code table, its name is displayed in a field indicated by a display item ID.

Figure 34:
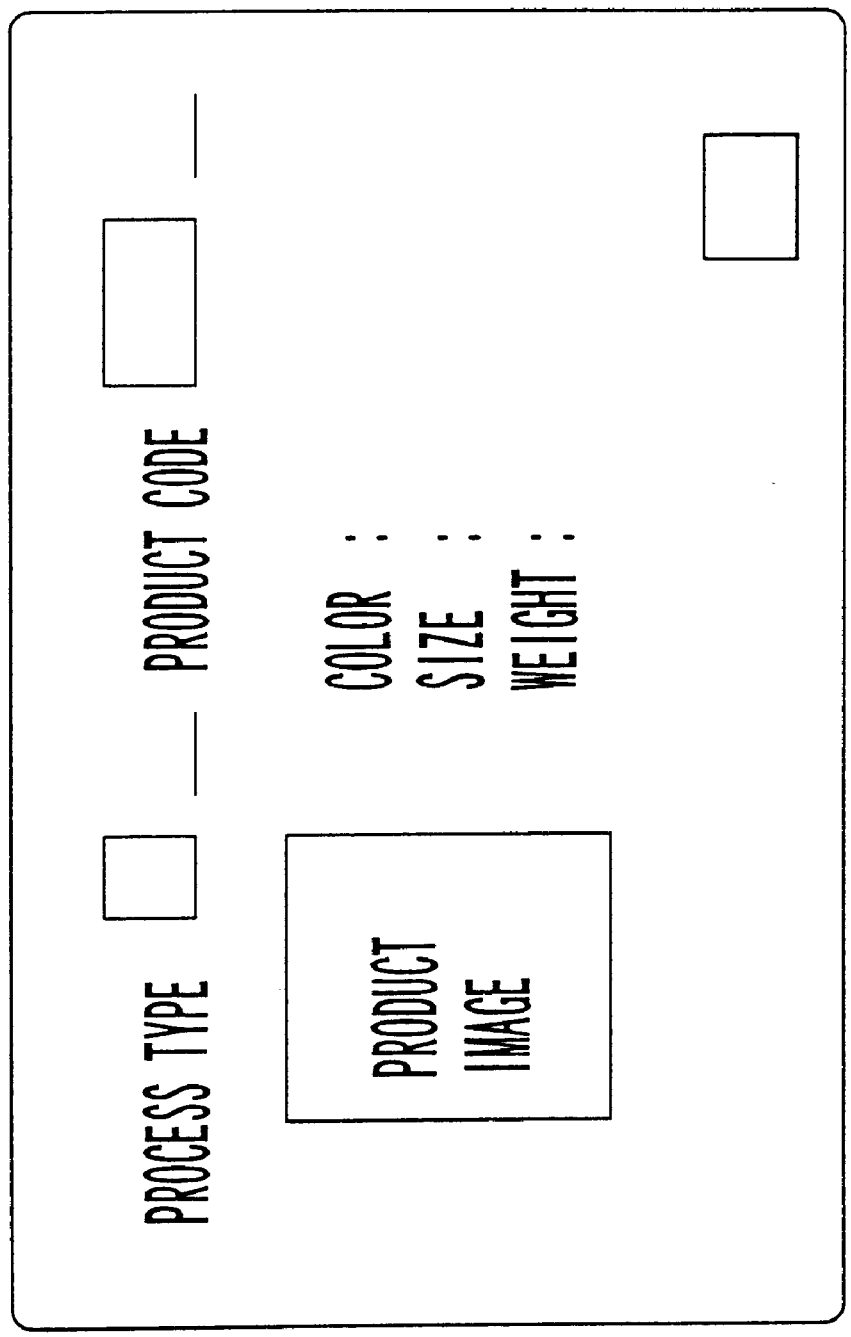
FIG. 34 is a schematic diagram showing groups on a screen.

FIG. 34 is a schematic diagram showing a group control process. In a head group, data to be processed in a body group are input via a keyboard. In the body group, data input in the head group is displayed and modified. In a tail group, the result of the process performed in the body group is verified. That is, a cursor which prompts a data entry moves from the head group, body group, and tail group in a cyclic order.

Figure 35:
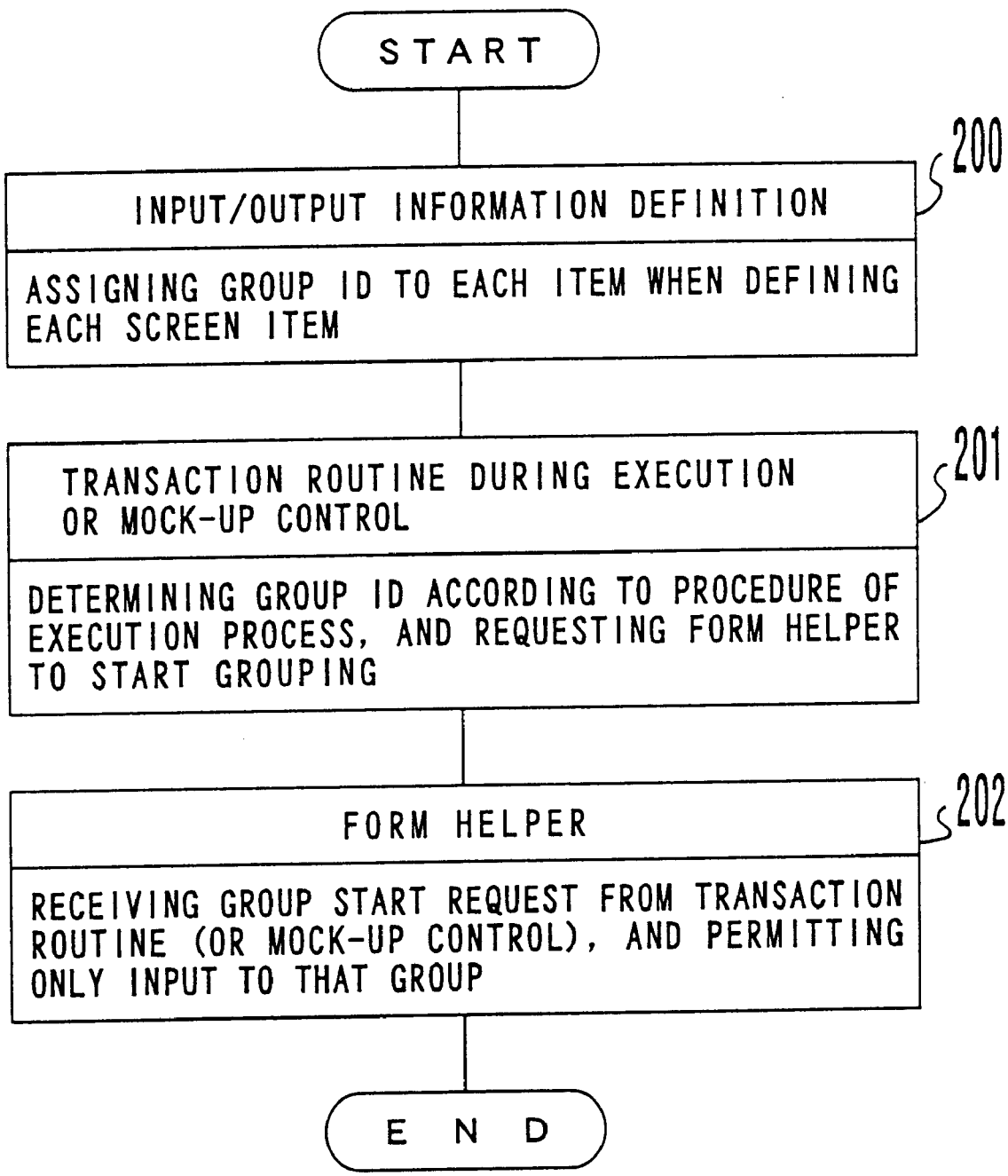
FIG. 35 is a flowchart showing an entire process for controlling a group.

FIG. 35 is a flowchart showing an entire group control process.

A group ID is specified as an input/output information definition for each item, when each screen item is defined in step 200.

Then, a transaction routine or a mock-up control under execution determines the group ID according to a procedure for executing a process, and requests a group start of the FORM helper, in step 201.

Then, the FORM helper receives the group start request from the transaction routine (or the mock-up control), references the group ID in an item table generated by an input/output definition, and subsequently permits only an input to that group, in step 202. Assume that the specifiable number of groups is up to 10 starting from 0 to 9. When a certain group among them is made active, an input to items in the other groups are prohibited in this case.

Figure 36:
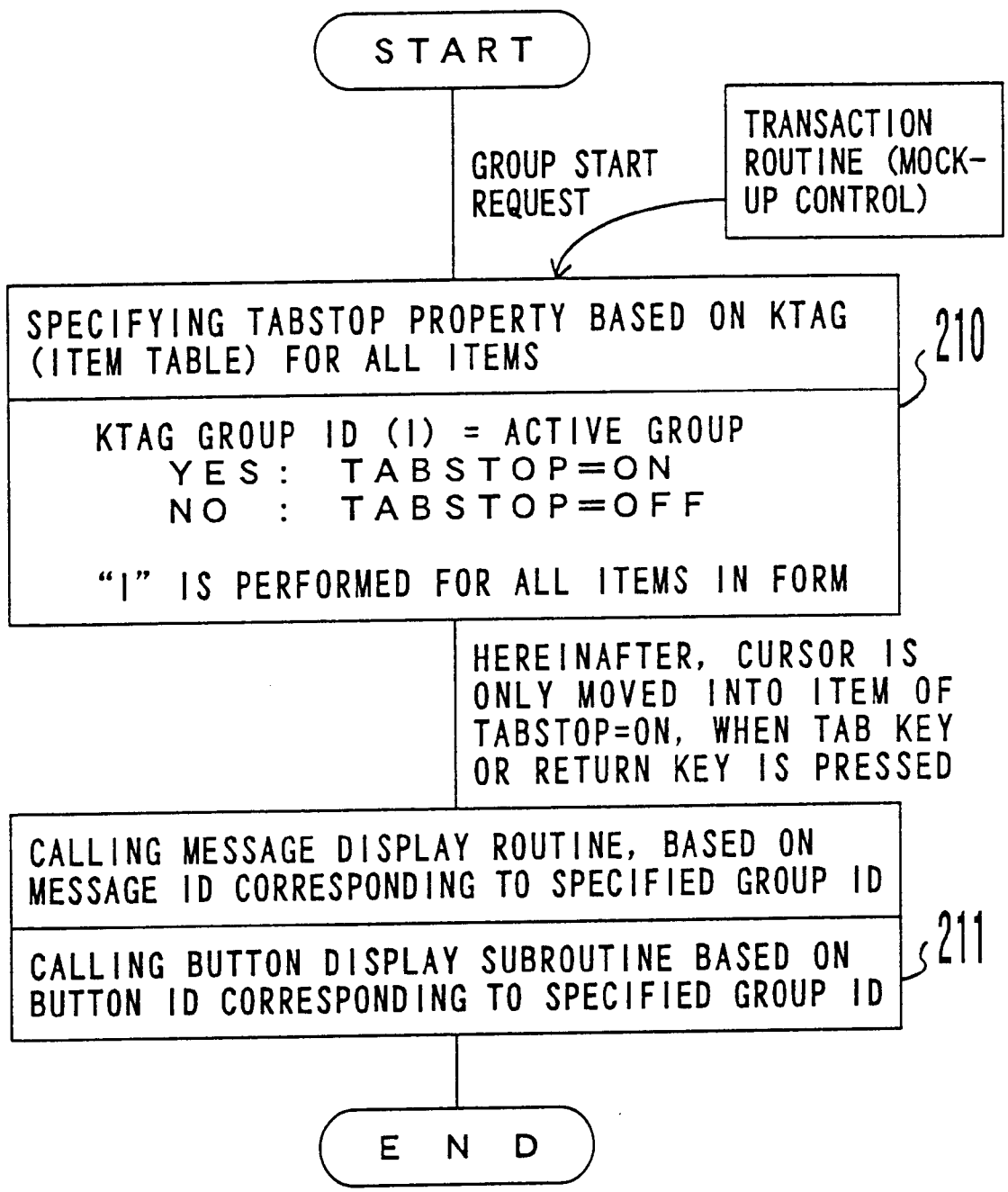
FIG. 36 is a flowchart showing a process for controlling a group performed by the FORM helper.

FIG. 36 is a flowchart showing a group control process performed by the FORM helper process.

When receiving a group start request from a transaction routine (mock-up control), the FORM helper specifies a TABSTOP property for all items based on the KTAG (item table) in step 210. That is, KTAG. group ID (I)=ACTIVE group.

If the group ID is active, the TABSTOP property is turned on. If it is inactive, the TABSTOP property is turned off, and "I" is performed for all the items in a FORM.

After that, a cursor only stops at an item whose TABSTOP property is turned on, in response to pressing a TAB key or a RETURN key. Then, the FORM helper calls a subroutine based on a message ID or a button ID, which corresponds to a specified group ID, in step 211.

Figure 37:
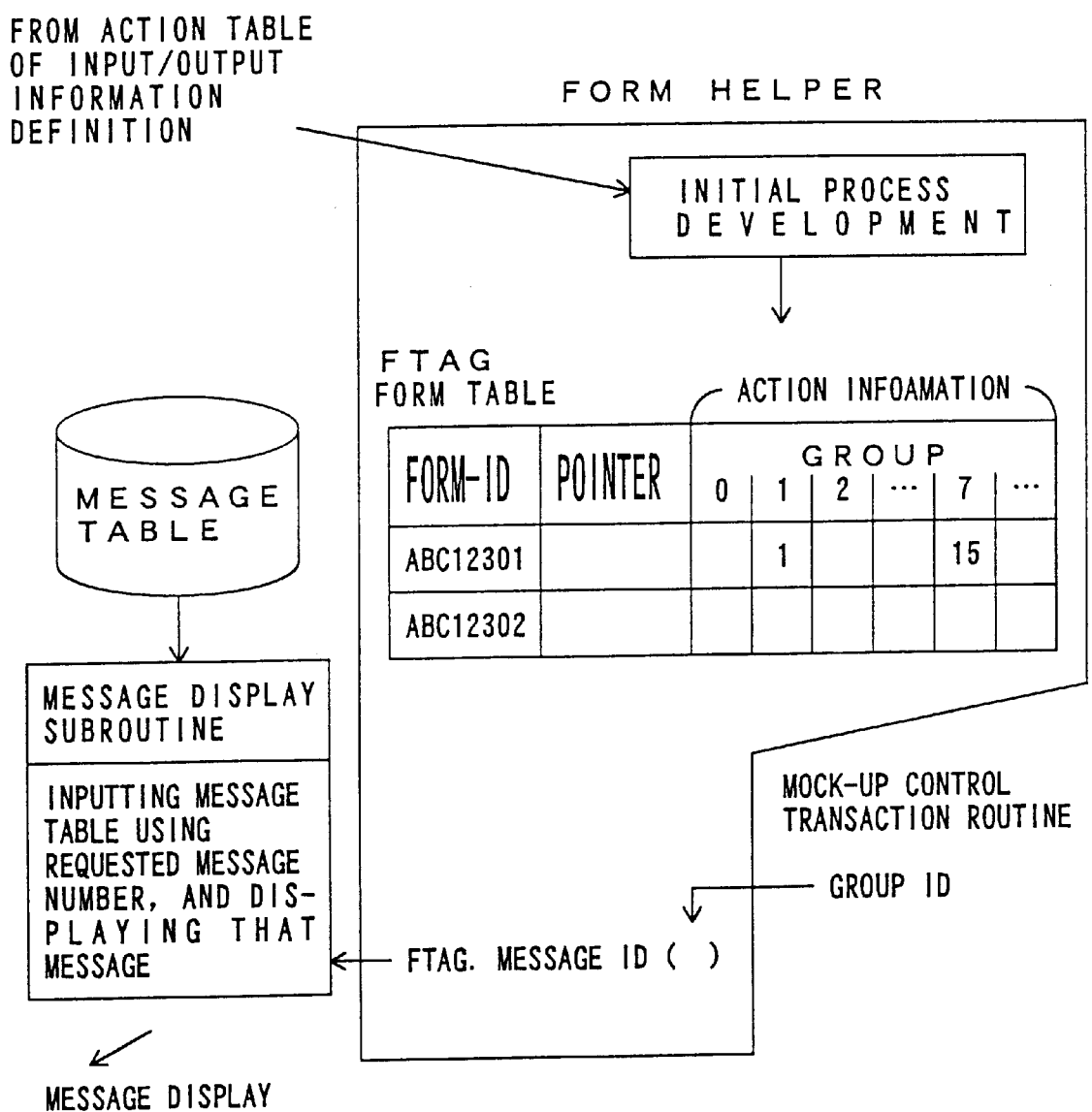
FIG. 37 is a schematic diagram explaining an action of an input/output information definition.

Provided below is the explanation about a process for displaying a message button, by referring to FIG. 37. The FORM helper develops an action table of an input/output information definer shown in FIG. 16, as an initial process. Then, a mock-up control process or a transaction routine specifies a group ID, and requests a start. The FORM helper then calls a subroutine for displaying a message based on a message ID corresponding to the specified group ID, or calls a subroutine for displaying a button based on a button ID corresponding to the specified group ID. If a screen whose FORM ID is "ABC12301", and messages E001 and E0015 are displayed, buttons B001 and B003 are driven for respective groups 1 and 7, according to the table of FIG. 16.

Figure 38:
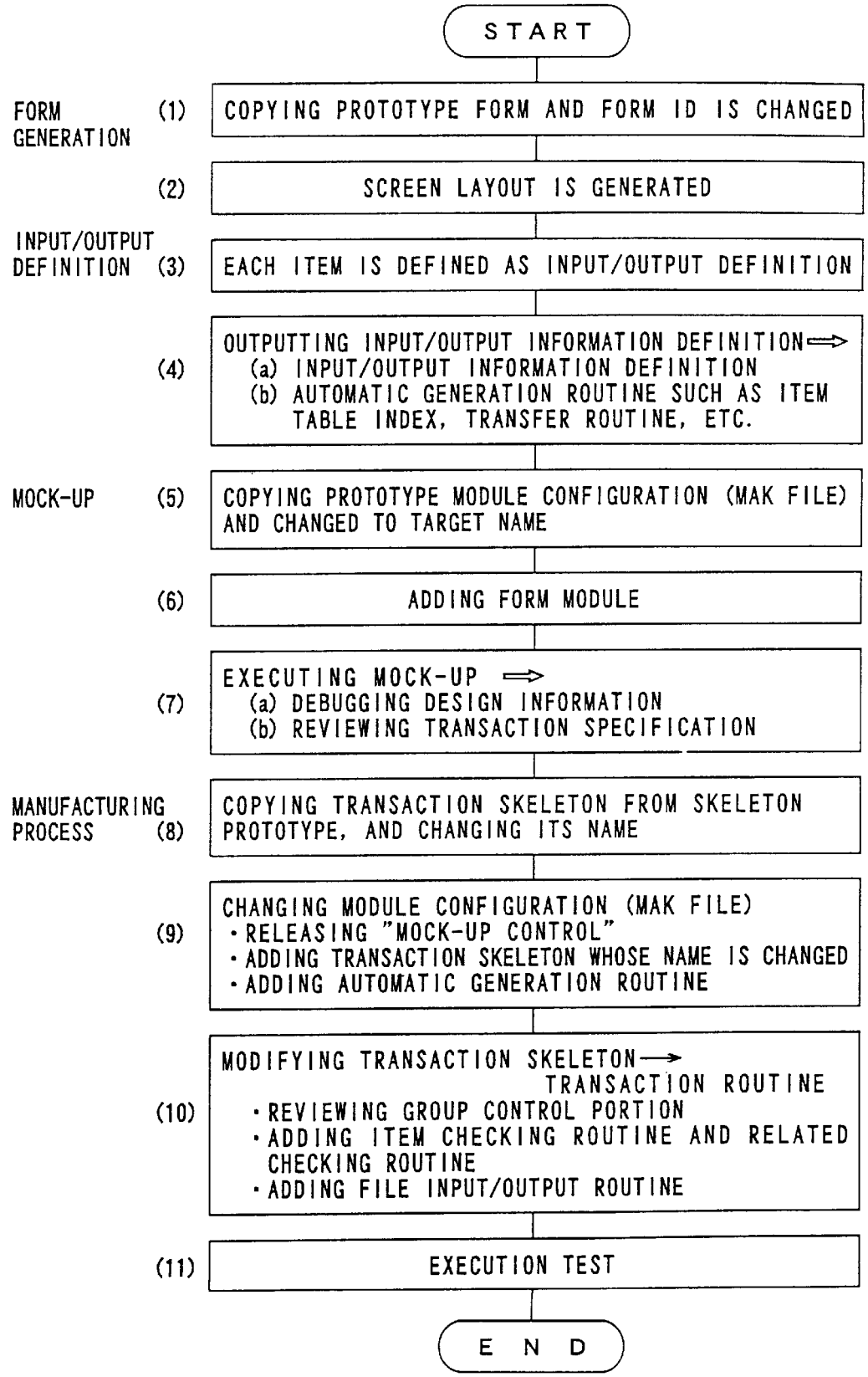
FIG. 38 is a flowchart showing inheritance of a component property.

FIG. 38 is a flowchart showing a process for inheriting a component property. To generate a FORM: (1) a new FORM ID is first generated by copying a FORM prototype and changing a target FORM name; (2) a screen layout is generated, and an input/output information definition screen is called; (3) each item is defined as an input/output information definition operation; and (4) the input/output definition is transferred to an input/output information definition file or/and an automatic generation routine such as an item index transfer routine, etc.

Then, the following mock-up control operations are performed: (5) a module configuration prototype is copied and its name is changed to a target name; (6) a FORM module, that is, the FORM ID generated in (2) is added; and (7) a mock-up execution is made to debug design information and review a transaction specification. The above listed operations (1) through (7) belong to a design process.

In a manufacturing process: (8) a transaction skeleton is copied from a skeleton prototype, and its name is changed; (9) the module configuration is changed, the mock-up control is released, and the transaction skeleton whose name was changed is added, and the automatic generation routine are appended; (10) the transaction skeleton is modified to review the group control part, append an item checking routine, related checking routines, and file input/output routines; and (11) an execution test is performed, and the development is terminated.

Figure 39:
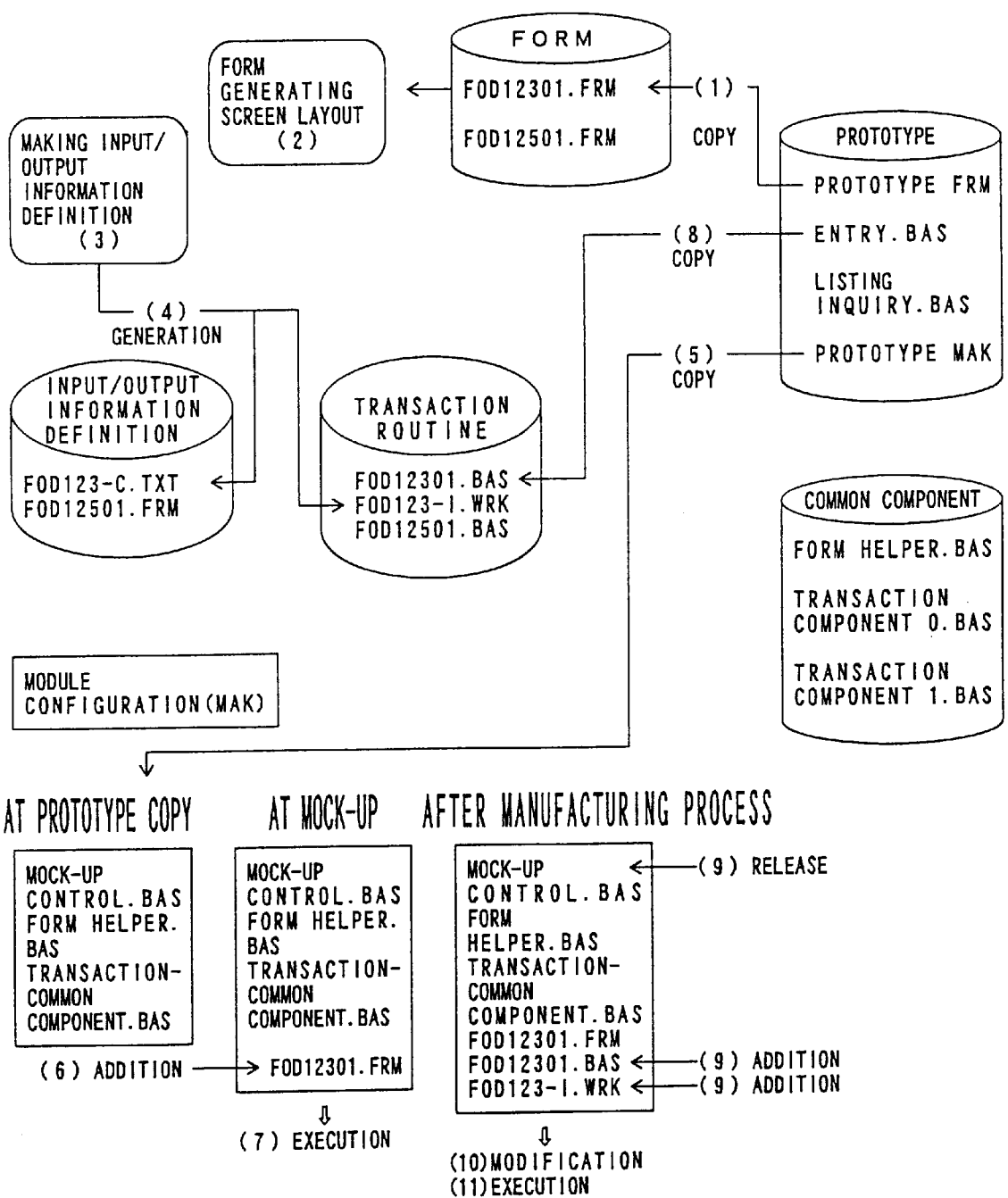
FIG. 39 is a block diagram explaining inheritance of component properties.

FIG. 39 is a schematic diagram showing a process for inheriting component properties: (1) a prototype is first copied from a prototype file, and input to a FORM file; (2) a screen layout is generated as a FORM; (3) an input/output information definition is made; (4) an input/output information definition file and automatic generation routines are generated based on the input/output information definition; (5) prototypes are copied from the prototype file to generate a module configuration (MAK), which includes the mock-up control, FORM helper, and transaction-common components; (6) a FORM module is added to the mock-up control process, FORM helper, and transaction-common component, for a mock-up; and (7) executed. As a manufacturing process: (8) an entry is copied from the prototype file, and stored in a transaction routine file; (9) the mock-up control is released, the FORM helper and transaction-common components are inherited as they are, and routines which are automatically generated from the transaction skeleton copied in (8), and the input/output information definition, are added; (10) modified and inherited; and (11) executed. Here, a module configuration file exists in each program execution unit, as a table whose name is a file name of a module of a corresponding program. Modification can be made to each module configuration file. For example, the manufacturing process inherits the above described item table (KTAG) and FORM table (FTAG) each time they are generated. The above described steps (1) through (11) correspond to steps (1) through (11) of FIG. 38.

Figure 40:
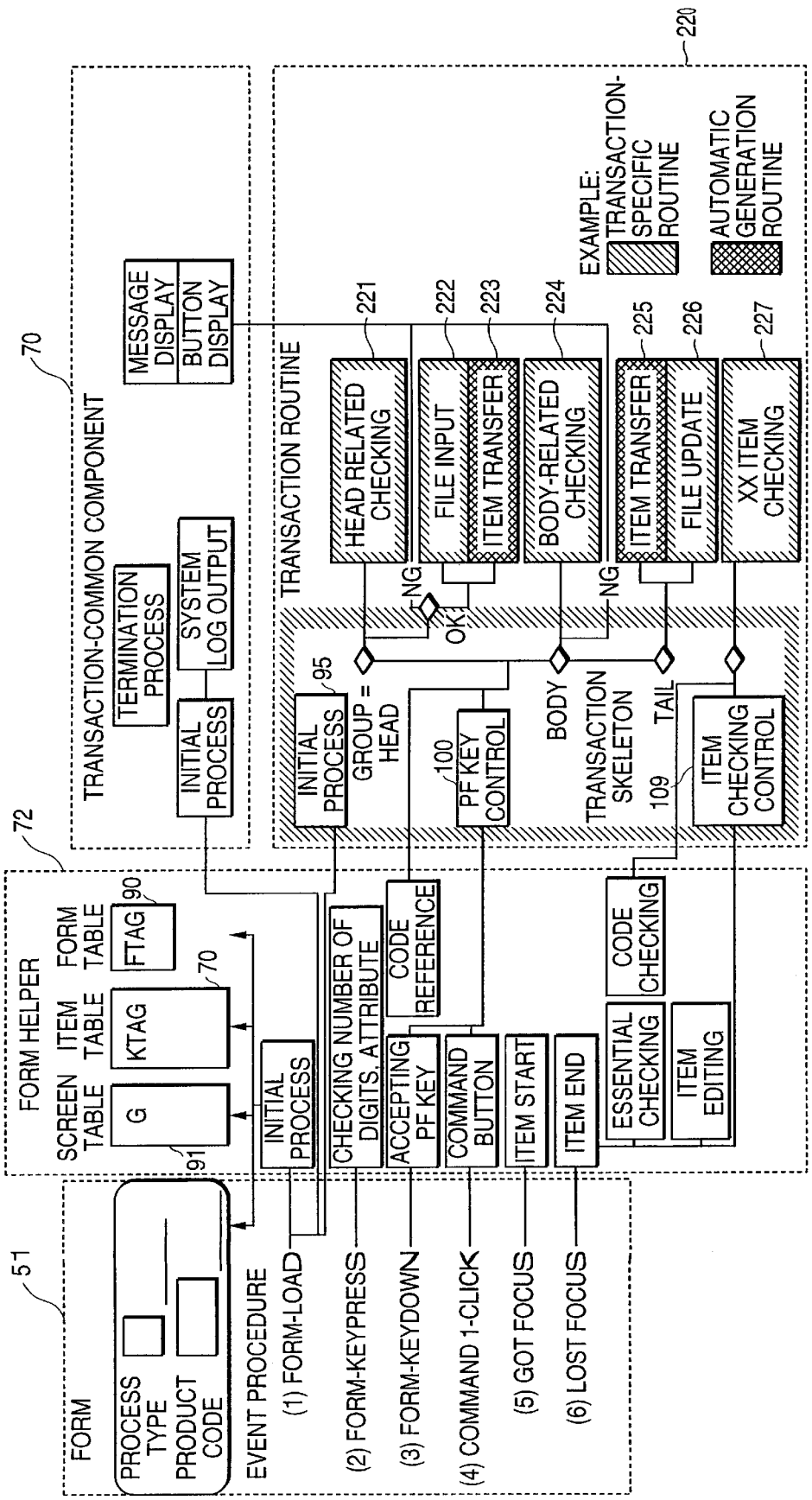
FIG. 40 is a schematic diagram showing the structure of a transaction routine application manufactured by inheriting a transaction-common component of a FORM and FORM helper.

FIG. 40 is a schematic diagram showing the entire structure of a mock-up control system which manufactures a program by inheriting the FORM helper and mock-up control process according to the present invention. The structure shown in this figure is the same as that of the mock-up control process shown in FIG. 17 except for a transaction routine 220. That is, this figure shows the case in which a transaction routine is executed, while FIG. 17 shows the case in which a mock-up control process is performed. As a transaction skeleton common to each transaction in the entire system control, an initial process 95, PF key control 100, and an item checking control 109 are similar to those in the mock-up control process. A transaction-specific routine and automatic generation routines are added as transaction routines.

In the transaction routines, after the PF key control process is performed in a transaction skeleton, a head-related checking 221 is first made. If the result of the checking is "NG", either message display or button display which is a common routine is driven. If "OK", a file input 222 for each transaction routine is made. Then, an item transfer 223 of data is performed to a screen to move to a body group.

Next, a body-related checking 224 is made in the body group. If "NG", either the message display or button display which is the common routine is performed. In a tail group, an item transfer 226 of data is performed from the screen in the transaction routines, and a file is updated. The head-related checking, file input, file update, and item checking in the transaction routines are transaction-specific routines, and the item transfers are the automatic generation routines.

Figure 41:
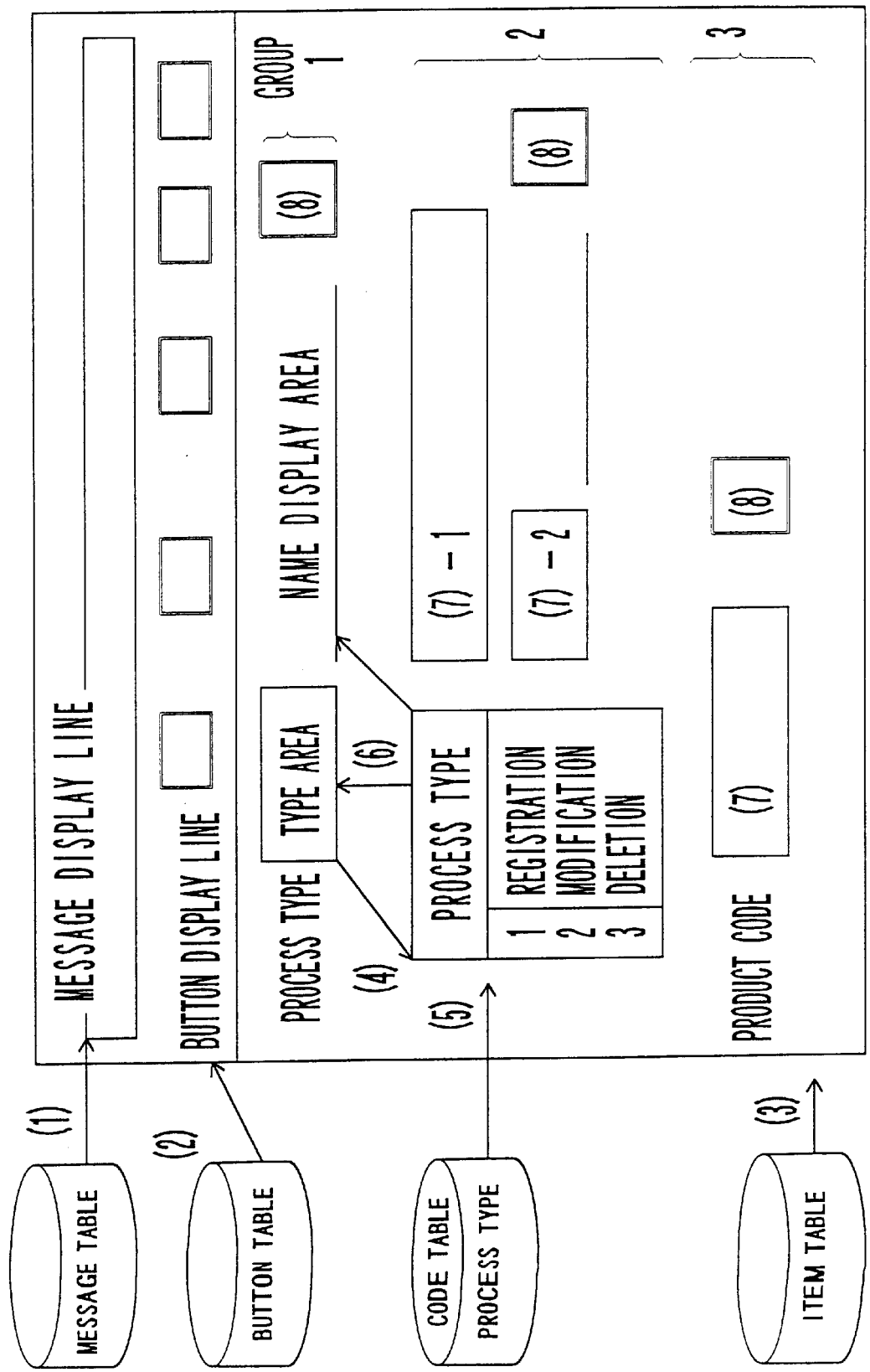
FIG. 41 shows a screen display of mock-up operations, and operations performed by the transaction routine application which inherits the mock-up operations, according to the present invention.

FIG. 41 shows a screen displaying mock-up operations.

(1) Displaying a message from a message table.
(2) Displaying a button from a button table.
(3) Grouping items in a FORM according to an item table. With this operation, a cursor does not move to an item outside a group.
(4) Performing a search (with a PF key or a button, etc.) (displaying a search window)
(5) Displaying data such as a code and a name from a code table.
(6) Reflecting selected data on an item address location next to a process type, and a result of checking a code on an underlined section, in the FORM.

| (7) | 1 Checking an input field. attributes the number of digits essential input | displayed in an error color (Red) in the case of an error |
|---|---|---|
| (7) | 2 editing numeral ¥, comma, etc. date year/month/date, time, etc. | |
| (7) | 3 inputting a product code | |
| (8) | Setting an ENTER point | |

Defining an ENTER point at the end of a group. A process within the group is completed and control is transferred to a next group, by pressing this button.

A user or a system engineer can reference a code or a name by inputting a code for checking validity of input data such as an item, etc., check to see if the code is correct, or edit the input data, for each group by making a group change on the screen shown in FIG. 41. Accordingly, a FORM varies depending on an input/output despite being at a design stage, thereby implementing and verifying a screen movement as in the case in which a program is actually manufactured.

As described above in detail, the present invention improves a conventional method where a program is returned after completion of a manufacturing process, in order to modify a design process or the manufacturing process, in the design or manufacturing process of a program. That is, the present invention provides a software development tool which can at least indicate whether or not data is entered, by implementing a mock-up according to design information, even though a transaction program of data entry does not actually run.

Since the manufacturing process automatically inherits the design information so generated as code information unchanged, programming is not required in that process. As a result, a program manufacturing process can significantly be simplified.

With mock-up execution, data can be displayed by using a checking routine arranged in the FORM helper, a common routine or a transaction-common component for the FORM helper arranged in a FORM in a common component, as if a data entry were made.

Additionally, the present invention attains a great effect in that a checking routine in a FORM helper, a common routine or a transaction-common routine in a common component, can be used again.

Furthermore, a screen layout is not written on paper or by a word processor, but is directly generated in a FORM, and input/output information etc. is generated with a CASE tool. Accordingly, design data can be managed intensively.

What is claimed is:

1. A mock-up method enabling a computer system to perform a mock-up operation of a transaction routine, comprising the steps of:

inputting a screen layout corresponding to the transaction routine to a FORM;

generating design information of item information to be input to the FORM at a stage prior to a process for manufacturing the transaction routine; and executing a mock-up of the transaction routine by displaying information about the item information on a screen based on the design information, in correspondence with an input of the item information to the screen, and verifying a screen display in the case in which the transaction routine is actually executed, at the stage prior to the process for manufacturing the transaction routine.

2. The mock-up method according to claim 1, wherein the mock-up executing step comprises a FORM helper step of searching the design information based on a field on the screen on which an input to the FORM is made, and displaying an output corresponding to the design information on the screen, thereby performing a pseudo operation of the transaction routine.

3. The mock-up method according to claim 2, wherein the FORM helper step sets the item information included in the design information also in a tag area in a table of a database, the tag area corresponding to the field on the screen.

4. The mock-up method according to claim 3, wherein the FORM helper step associates an input on the screen with the design information based on the item information set in the tag area corresponding to the field on the screen, and the item information included in the design information, and displays an output corresponding to the input on the screen.

5. The mock-up method according to claim 4, wherein the FORM helper step verifies the validity of predetermined item information input to the FORM, by associating a screen location of the predetermined item information to be input to the FORM, with an address in a file storing the design information of the predetermined item information.

6. The mock-up method according to claim 5, wherein the FORM helper step uses an item ID corresponding to the predetermined item information input to the FORM, and an item ID of the design information, and associates the item ID corresponding to the predetermined item information with the item ID of the design information.

7. The mock-up method according to claim 1, wherein the design information generating step further comprises the steps of:
generating an input/output information definer having an item ID corresponding to a predetermined item input to the FORM by using an item dictionary; and
attaching a corresponding item ID into the predetermined item input to the FORM by using the input/output information definer.

8. The mock-up method according to claim 2, wherein the FORM helper step comprises the steps of:
generating a design information table including the design information about predetermined item information input to the FORM; and
determining the validity of the item information input to the FORM by using the design information table.

9. The mock-up method according to claim 8, wherein the design information table is composed of at least one of an item table storing the item information, and a code table storing specific information in the item information.

10. The mock-up method according to claim 9, wherein the validity determining step performing a routine for checking the number of digits, comprises the steps of:
extracting a number of digits of a design of a field to which data is input from the item table;
examining a data length of input data; and
making a comparison between the number of digits of the design and the data length.

11. The mock-up method according to claim 9, wherein the validity determining step performing an attribute checking step comprises the steps of:
extracting a design attribute of a field to which data is input from the item table; and
checking an attribute by making at least one of a numeric checking, alphanumeric checking, and a date checking, based on an attribute of the field to which the data is input.

12. The mock-up method according to claim 9, wherein the validity determining step comprises the steps of:
extracting an essential number of digits of a field to which data is input from the item table;
examining a data length of input data; and
checking an essential input, in order to recognize that an input is made to an essential item on the condition that the essential number of digits is not larger than the data length.

13. The mock-up method according to claim 9, further comprising the step of:
referencing a code and a name corresponding to a particular field on a screen, or checking a code input to the particular field, by using the code table.

14. The mock-up method according to claim 13, wherein the code referencing step references the item table based on an item address from the particular field on the screen, by using a TAG and a screen table, searches a code ID in the item table, references the code table based on the code ID, and selects a desired code and name from the code table.

15. The mock-up method according to claim 13, wherein the code checking step references the item table based on an item address from the particular field on the screen to which a code is input, by using a TAG and a screen table, searches a code ID in the item table, references the code table based on the code ID, determines whether or not a code input from the code table exists, and display a name of the code if it exists.

16. The mock-up method according to claim 2, wherein the mock-up executing step performing an item editing step comprises the steps of:
extracting an editing ID of an item at which a cursor is currently positioned, from an item table;
saving a text area on the screen if the editing ID exists; and
performing item editing by performing at least one of numeric editing, currency editing, and date editing, based on contents saved in the text area.

17. The mock-up method according to claim 2, further comprising the step of:
generating message information and button information, wherein
the message information and the button information are displayed on the screen in the mock-up executing step.

18. The mock-up method according to claim 17, wherein the manufacturing process inherits the FORM and at least one of the item information and the button information.

19. A mock-up control apparatus using a computer system for performing a mock-up operation of a transaction routine, comprising:
FORM corresponding to a screen;
code table including at least a code of a transaction related to a transaction routine;
an item table including at least an item ID and a code ID;

pointer means for associating a location of a field in the FORM with an address in the item table;

name reference and code checking means for referencing a code and a name from the code table using the pointer means, or checking whether or not the code is correct based on a code input to the field in the FORM, and displaying the code and the name in a particular field in the FORM, wherein an item table related to the transaction routine and a corresponding code table are generated by using the name reference and code checking means, independently from a generation of an actual program of the transaction routine.

20. The mock-up control apparatus according to claim 19, wherein the FORM, code table, and item table, which configure the mock-up control apparatus, are automatically inherited from a design process.

21. A mock-up control apparatus using a computer system for performing a mock-up-operation of a transaction routine, comprising:

a FORM corresponding to a screen;

an item table including an item ID and a code ID;

pointer means for associating an address in a field in the FORM with an address in the item table; and group control means for sequentially making a screen transition accompanying a process for making an input to the FORM, and a process performed by referencing the item table, by partitioning a screen into head, body, and tail groups, wherein a screen transition similar to at least part of the transaction routine is executed independently from generation of an actual program, by using the group control means.

22. A mock-up method using a computer system for performing a mock-up operation of a transaction routine, which uses a FORM helper control method comprising the steps of generating a screen table in which an address is arranged for each address in the item table; searching for the item table based on an item ID set in the TAG area; and setting an address of the item included in the item table, in the TAG area, and at the same time, setting a FORM item address of the predetermined item included in the FORM, in the screen table, if a match is found for the item ID, comprising the steps of:

inputting predetermined item information corresponding to a transaction routine, to a FORM;

displaying an output corresponding to the predetermined item information input based on design information about a predetermined item; and verifying a screen display in the case in which the transaction routine is actually manufactured, by performing the screen input step and the screen output step prior to a manufacturing process of the transaction routine.

23. A mock-up method enabling a computer system to perform a pseudo operation of a program, comprising the steps of:

inputting a screen layout corresponding to the program to a screen definer;

generating design information of item information to be input to the screen definer at a stage prior to a process for manufacturing the program; and executing the pseudo operation of the program by displaying information about the item information on a screen based on the design information, in correspondence with an input of the item information to the screen, and verifying a screen display in the case in which the program is actually executed, at the stage prior to the process for manufacturing the program.

24. The mock-up method according to claim 23, wherein the pseudo operation executing step comprises a screen definer helper step of searching the design information based on a field on the screen on which an input to the screen definer is made, and displaying an output corresponding to the design information on the screen.

25. A mock-up control apparatus using a computer system for performing a mock-up operation of a transaction routine, comprising:

a screen definer corresponding-to a screen;

a code table including at least a code of a program;

an item table including at least an item ID and a code ID;

pointer means for associating a location of a field in the screen definer with an address in the item table;

name reference and code checking means for referencing a code and a name from the code table using the pointer means, or checking whether or not the code is correct based on a code input to the field in the screen definer, and displaying the code and the name in a particular field in the screen definer, wherein an item table related to the program and a corresponding code table are generated by using the name reference and code checking means, independently from a generation of an actual program.

* * * * *